United States Patent [19]

Teramoto et al.

[11] Patent Number: 5,392,740
[45] Date of Patent: Feb. 28, 1995

[54] GAS FUEL ENGINE

[75] Inventors: Takafumi Teramoto; Eiji Takano; Hiroyasu Uchida; Kenji Morimoto; Tsutomu Fukuma, all of Hiroshima, Japan

[73] Assignee: Mazda Motor Corporation, Hiroshima, Japan

[21] Appl. No.: 169,128

[22] Filed: Dec. 20, 1993

Related U.S. Application Data

[63] Continuation-in-part of Ser. No. 128,580, Sep. 30, 1993, abandoned, which is a continuation-in-part of Ser. No. 789,278, Nov. 8, 1991, Pat. No. 5,271,359.

[30] Foreign Application Priority Data

| Nov. 20, 1990 | [JP] | Japan | 1-316856 |
| Jan. 21, 1991 | [JP] | Japan | 3-118989 |
| Mar. 29, 1991 | [JP] | Japan | 3-091632 |
| Mar. 29, 1991 | [JP] | Japan | 3-091633 |

[51] Int. Cl.⁶ .................................. F02B 43/08
[52] U.S. Cl. ........................... 123/3; 123/DIG. 12
[58] Field of Search .................. 123/3, DIG. 12, 527

[56] References Cited

U.S. PATENT DOCUMENTS 5,305,714  4/1994  Sekiguchi et al. ............ 123/DIG. 12

FOREIGN PATENT DOCUMENTS

| 246459 | 10/1988 | Japan | 123/DIG. 12 |
| 4187826 | 7/1992 | Japan | 123/DIG. 12 |
| 5106513 | 4/1993 | Japan | 123/DIG. 12 |

*Primary Examiner*—E. Rollins Cross
*Assistant Examiner*—Erick Solis
*Attorney, Agent, or Firm*—Sixbey, Friedman, Leedom & Ferguson

[57] ABSTRACT

A gaseous fuel rotary piston engine has a rotor housing and a rotor. A side housing of the rotor housing is provided with an air intake port for supplying air to working chambers defined in the rotor housing and a gaseous fuel port which is connected to a gaseous fuel source through a fuel supply passage and through which gaseous fuel is supplied to the working chambers. The air intake port is formed to open near the top dead center on the intake stroke and close after the bottom dead center on the intake stroke. The gaseous fuel port is formed to open near the opening time of the air intake port and close substantially at the middle of the compression stroke. Additionally, a hydrogen engine is connected to a hydrogen discharging tank containing a hydrogen storage alloy by way of a heating medium passage and a hydrogen supply passage. A pressure tank is provided in the hydrogen supply passage. A control means for limiting the starting of the engine until the pressure of the hydrogen gas in the pressure tank reaches a predetermined value is provided on the engine. When the engine is to be started, a heating medium in the heating medium passage heats the hydrogen discharging tank to discharge hydrogen gas therefrom. The discharged hydrogen gas is supplied to the pressure tank to increase the pressure of the hydrogen gas in the tank. The control means detects the pressure to limit the start of the engine until the pressure reaches the predetermined value.

7 Claims, 21 Drawing Sheets

F I G. 11
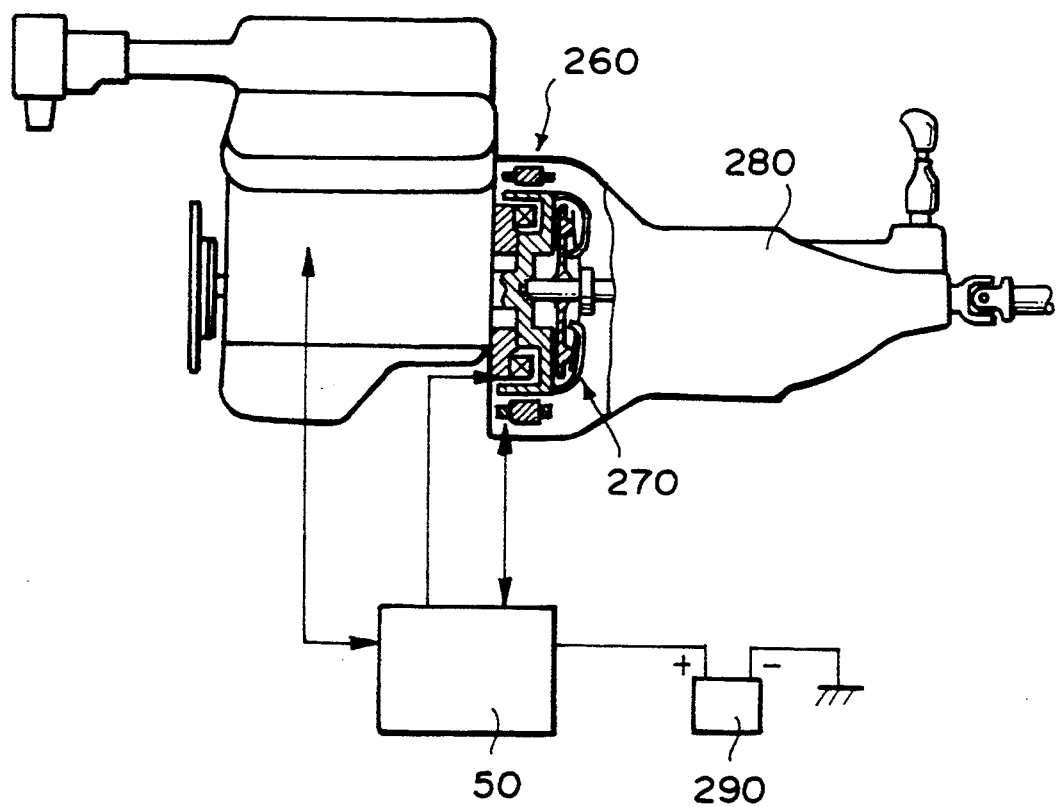

F I G. 13
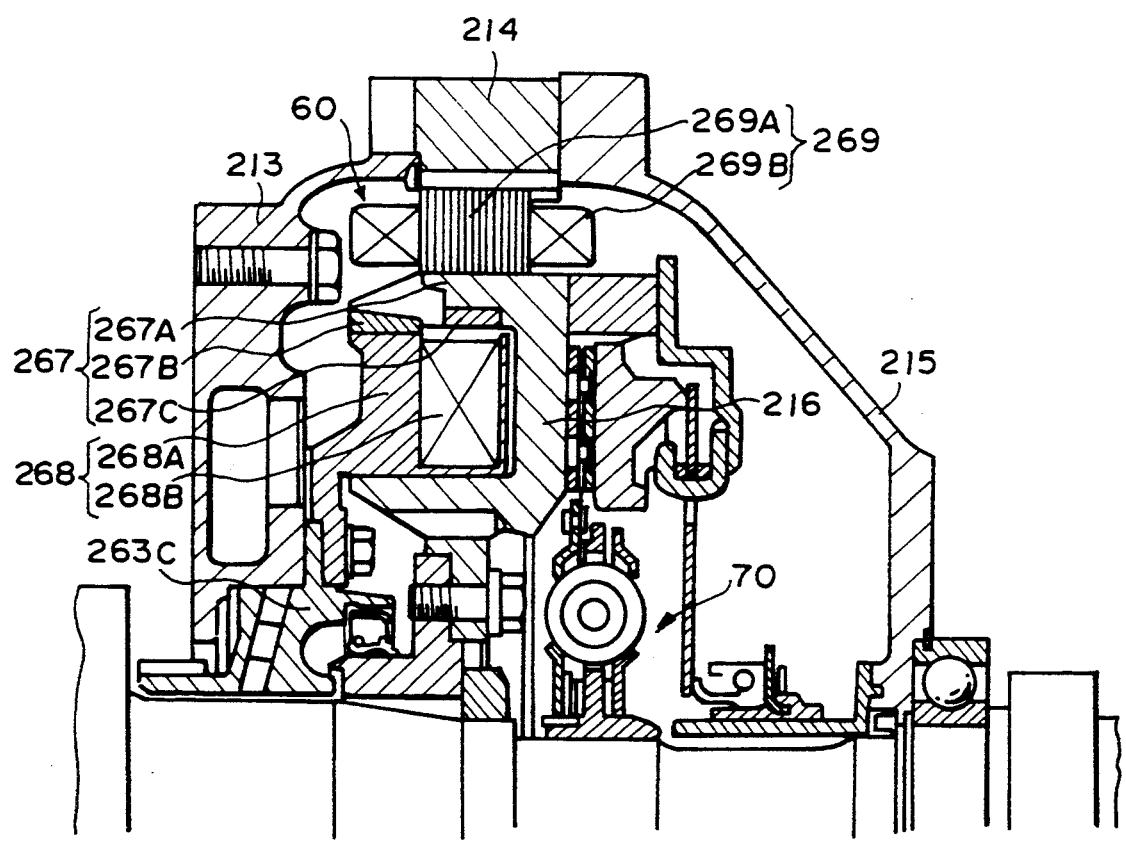

F I G. 15
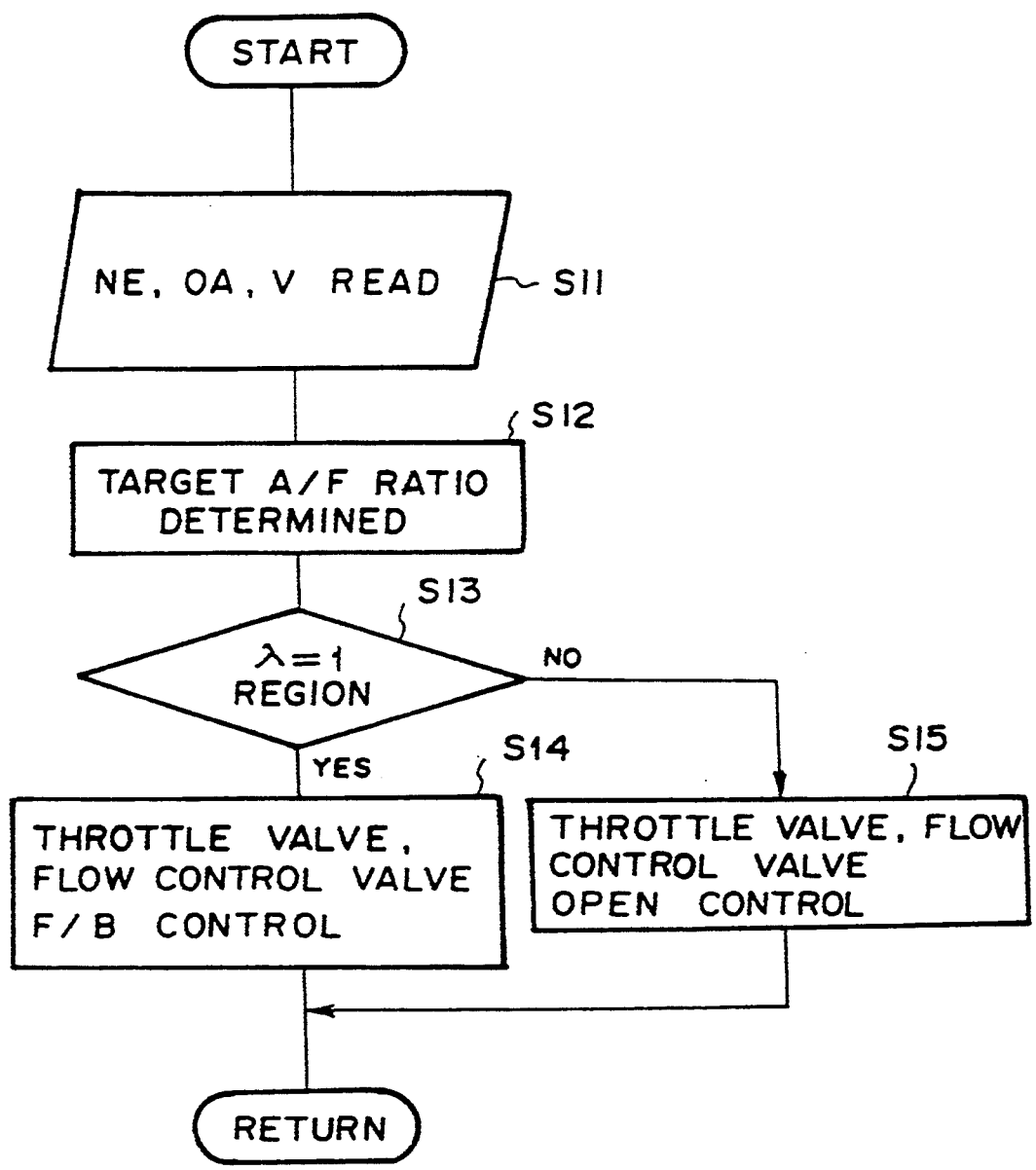

GAS FUEL ENGINE

This application is a continuation-in-part application of application Ser. No. 08/128,580, filed Sep. 30, 1993, now abandoned, which in turn was a continuation-in-part of application Ser. No. 07/789,278, filed Nov. 8, 1991, now U.S. Pat. No. 5,271,359.

BACKGROUND OF THE INVENTION

1. Field of the Invention

This invention relates to a gaseous fuel engine in which combustible gas such as hydrogen, methane, ethane or the like is used as fuel. Further, this invention relates to a hydrogen engine, and more particularly to an improvement in a hydrogen engine for automobiles.

2. Description of the Prior Art

Recently, there have been proposed various gaseous fuel engines in which combustible gas such as hydrogen, methane, ethane or the like is used as fuel. Especially, a hydrogen engine is highly expected as a pollution-free engine since hydrogen forms neither carbon dioxide or poisonous unburned component.

However if gaseous fuel is supplied to a conventional gasoline engine instead of gasoline, various problems will arise because of differences in physical and chemical properties between gasoline and the gaseous fuel.

The air-fuel ratio in a combustible mixture of gaseous fuel is incomparably larger than that of vaporized fuel like gasoline, and accordingly, if gaseous fuel is introduced into the cylinders from an intake passage in the form of an air-fuel mixture, the amount of intake air reduces, which results in reduction of the engine output power. Especially, in the case of hydrogen, high burning speed of hydrogen is apt to cause backfiring in the intake passage or premature ignition of fuel.

In order to overcome the aforesaid problems, it has been proposed to provide a gaseous fuel port with a gaseous fuel supply valve separately from the intake port and to introduce gaseous fuel through the gaseous fuel port separately from intake air. For example, in the gaseous fuel engine disclosed in Japanese Patent Publication No. 58(1983)-12458, the gaseous fuel supply valve is opened after closure of the intake valve, whereby the air charging efficiency is improved and at the same time, backfiring is prevented. In the gaseous fuel engine disclosed in Japanese Patent Publication No. 1(1989)-23659, the gaseous fuel supply valve is large in diameter and relatively small in lift and is opened near the BDC just before the end of the intake stroke, whereby the air charging efficiency is improved and at the same time, backfiring is prevented. Further, in the gaseous fuel engine disclosed in Japanese Patent Publication No. 59(1984)-14611, the gaseous fuel port is disposed diametrically opposed to the exhaust valve and intake ports are provided at 90° from the gaseous fuel port and the exhaust valve so that arrival of the gaseous fuel to the exhaust port is delayed, thereby preventing premature ignition of the gaseous fuel.

However, when the gaseous fuel port is opened and the gaseous fuel is injected into the cylinder for a predetermined time just before or after closure of the intake valve, injection of fuel into the cylinder is effected at the start of the compression stroke after all and it becomes harder for the gaseous fuel to flow into the cylinder as the volume in the cylinder becomes smaller and the pressure in the cylinder increases. This results in a poor charging efficiency of the gaseous fuel. This problem is especially serious when the gaseous fuel is supplied under a relatively low pressure like in the case where hydrogen stored in hydrogen storage alloy is used as the gaseous fuel. If the pressure in the cylinder becomes higher than the gaseous fuel injecting pressure while the gaseous fuel supply valve is open, the air-fuel mixture can reverse into the gaseous fuel supply pipe and backfiring can occur.

Accordingly, it is preferred that the gaseous fuel port be as large as possible in opening area so that a required amount of gaseous fuel can be introduced into the cylinder in a short time. However, when a puppet valve, which is normally used in a four-cycle reciprocating engine, is used to close and open the gaseous fuel port, the effective opening area inherently changes with the amount of lift of the valve and the time that the valve is full opened occupies only a small part of the valve opening time. This together with limitations by layout and/or arrangement of the camshaft makes it very difficult to satisfy both the requirements on the valve opening time and the opening area.

When the air-fuel mixture is made lean in order to prevent premature ignition, the amount of fuel to be fed to the cylinder is limited and accordingly, the engine output cannot be sufficiently increased.

Further to the above, as a pollution-free engine, there have been proposed a hydrogen engine in which hydrogen gas is used as fuel.

For example, as disclosed in Japanese Unexamined Patent Publication No. 1(1989)-230119, there has been proposed a hydrogen engine wherein a hydrogen discharging tank containing a hydrogen storage alloy is connected to an engine body, and a heating medium passage wherein a heating medium for heating the hydrogen storage alloy is caused to flow is provided to supply hydrogen gas discharged from the hydrogen discharging tank to the engine body as fuel.

In the aforesaid conventionally known hydrogen engine, when the hydrogen engine is started, a sufficient amount of hydrogen cannot be discharged from the hydrogen discharging tank. Accordingly, if the starter motor is driven simultaneously with turning on the starter switch, the engine does not start until the amount of hydrogen gas supplied to the engine body reaches a predetermined value, and both hydrogen gas and the battery power to drive the starter motor are wasted.

SUMMARY OF THE INVENTION

In view of the foregoing observations and description, the primary object of the present invention is to provide a gaseous fuel engine in which a predetermined charging efficiency can be obtained and a desired engine output can be ensured even if the gaseous fuel is supplied under a relatively low pressure.

Another object of the present invention is to provide a gaseous fuel engine in which premature ignition of the fuel can be prevented and a desired engine output can be ensured.

In accordance with the present invention, there is provided a gaseous fuel rotary piston engine comprising a rotor housing having a peritrochoidal inner surface and rotor which has a contour in the form of an inner envelop surface of the peritrochoidal inner surface of the rotor housing characterized in that a side housing of the rotor housing is provided with an air intake port for supplying air to working chambers defined in the rotor housing and a gaseous fuel port which is connected to a gaseous fuel source through a fuel supply passage and through which gaseous fuel is supplied to the working chambers, the air intake port being formed to open near the top dead center on the intake stroke and close after the bottom dead center on the intake stroke and the gaseous fuel port being formed to open near the opening time of the air intake port and close substantially at the middle of the compression stroke.

Further, in view of the foregoing observation and description, the primary object of the present invention is to provide a hydrogen engine in which the starting efficiency of the engine can be increased.

In accordance with the present invention, there is provided a hydrogen engine which comprises:

a hydrogen discharging tank for containing a hydrogen storage alloy, which is connected to an engine body, a heating medium passage, through which a heating medium for heating the hydrogen storage alloy, is caused to flow, and a hydrogen supply passage through which hydrogen gas discharged from the hydrogen discharging tank is supplied to the engine as fuel, characterized by;

having a pressure tank provided in the hydrogen supply passage to store the hydrogen gas, and a control means for limiting the starting of the engine until the pressure of the hydrogen gas in the pressure tank reaches a predetermined value.

In the hydrogen engine according to the present invention, the engine cannot be started until the pressure of hydrogen gas in the pressure tank of the hydrogen supply passage increases to a predetermined value, whereby the waste of the fuel gas and the battery power is avoided.

BRIEF DESCRIPTION OF THE DRAWINGS

FIG. 11 is a schematic view showing still another embodiment of the present invention, FIG. 13 is a fragmentary cross-sectional view showing the selsyn dynamo, FIG. 15 is a flow chart for illustrating the air-fuel ratio control according to the warm control table.

DESCRIPTION OF THE PREFERRED EMBODIMENT

Figure 1:
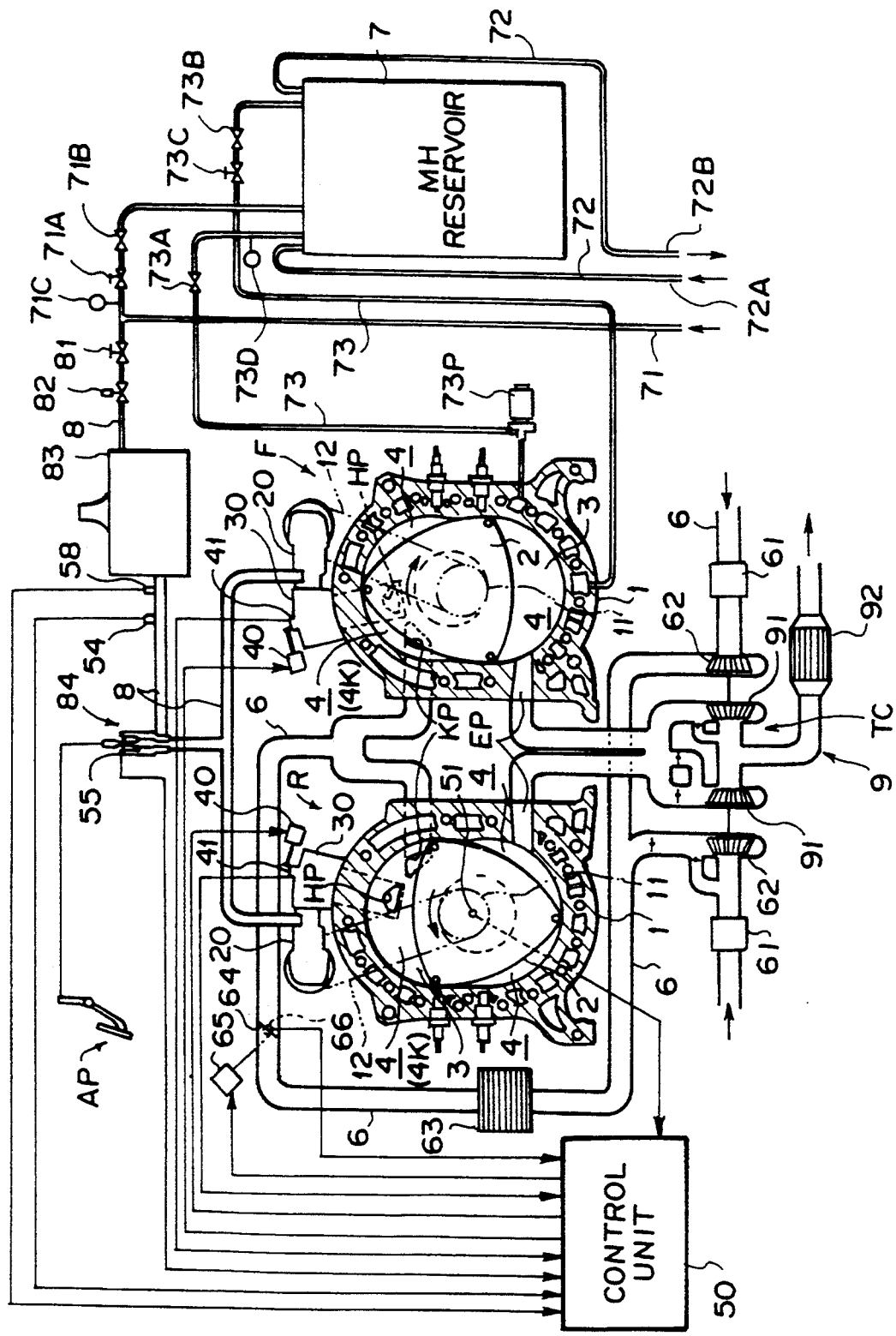
FIG. 1 is a schematic view showing a hydrogen rotary piston engine in accordance with an embodiment of the present invention.

In FIG. 1, a two-rotor rotary piston engine has a pair of rotor housings 1 each having a peritrochoidal inner surface. A rotor 2 having three inner envelope surfaces is disposed in each rotor housing 1 so that its three lobes are in contact with the inner surface of the rotor housing 1 by way of apex seals, and three working chambers 4 are defined by the inner surface of the rotor housing 1, the outer peripheral surface of the rotor 2, a pair of side housings (not shown in FIG. 1) which are mounted on opposite sides of the rotor housing 1 and an intermediate housing 3. The volume in each working chamber 4 changes as the rotor 2 eccentrically rotates, whereby Otto cycles are performed. The rotation of the rotor 2 is transmitted to an eccentric shaft 11 to drive it.

An air intake port KP and a hydrogen port HP formed in predetermined positions in the intermediate housing 3 so that they open to the working chamber 4 which is in the intake stroke. (The working chamber 4 which is in the intake stroke is denoted by 4k in FIG. 1.) Intake air is supplied to the air intake port KP through an intake passage 6, and hydrogen gas stored in a metal hydride reservoir (will be referred to as "MH reservoir", hereinbelow) 7 is supplied to the hydrogen port HP through a fuel supply passage 8. A fuel control unit 50 controls supply of the intake air and the hydrogen gas as will be described in detail later. The engine speed detected by an engine speed sensor 51 which detects the engine speed through the rotational speed of the eccentric shaft 11 is input into the fuel control unit 50.

The intermediate housing 3 is a partition member disposed between the front cylinder F (positioned on the right side as seen in FIG. 1) and the rear cylinder R (positioned on the left side as seen in FIG. 1) and has a function similar to the that of the side housing. The rotors 2 in the front and rear cylinders F and R respectively abut against the front and rear sides of the intermediate housing 3 by way of side seals (not shown) and slide thereon. The rotors 2 in the respective cylinders F and R run at 180° to each other.

The MH reservoir 7 has a hydrogen storage alloy which can occlude and release hydrogen. A hydrogen charging passage 71 for supplying hydrogen to the hydrogen storage alloy and a coolant passage 72 through which coolant for cooling the hydrogen storage alloy flows are connected to the MH reservoir 7. Further, a heating water passage 73 is connected to the MH reservoir 7 in order to heat the hydrogen storage alloy by the engine coolant.

Hydrogen molecules enter metal crystal lattices of the hydrogen storage alloy and forms crystal lattices of the hydrogen storage alloy and forms metal hydride there. Thus hydrogen is stored in the hydrogen storage alloy in the form of metal hydride. When the hydrogen storage alloy is cooled, formation of metal hydride is promoted and hydrogen is occluded in the hydrogen storage alloy, and when the hydrogen storage alloy is heated, hydrogen is released therefrom. Examples of the metal hydride is as follows.

$MgH_2$, $UH_3$, $TiH_2$, $VH_2$, $ZrH_2$, $LaH_3$, $Mg_2NH_4$, $TiFeH_{1.9}$, $LaNi_5H_6$, $MmNi_5H_{6.3}$, $MmNi_{4.5}Mn_{0.5}H_{6.6}$, $MmNi_{4.5}Al_{0.5}H_{4.9}$ (Mm denotes mesh metal).

The hydrogen charging passage 71 is connected to the MH reservoir 7 by way of a cock 71A and a relief valve 71B. Reference numeral 71C denotes a pressure sensor which denotes the hydrogen gas pressure in the MH reservoir 7.

The coolant passage 72 is formed so that water supplied through a water port 72A circulates through the MH reservoir 7 to cool the hydrogen storage alloy and flows out through a water discharge port 72B. When hydrogen is supplied to the hydrogen storage alloy through the hydrogen charging passage 71, water is flowed through the coolant passage 72 to cool the hydrogen storage alloy and promote occlusion of hydrogen in the hydrogen storage alloy.

The heating water passage 73 is formed to flow engine coolant in a water jacket of the rotor housing 1 through the MH reservoir 7 and return it to the water jacket, thereby heating the hydrogen storage alloy by the heat of the engine coolant to release hydrogen from the hydrogen storage alloy. Reference numeral 73P denotes a water pump, reference numerals 73A and 73B denote check valves and reference numeral 73C denotes a regulator Valve. The pressure of hydrogen in the MH reservoir 7 reaches about 9 atm at the maximum. Reference numeral 73D denotes a temperature sensor which detects the temperature of the engine coolant.

The intake passage 6 is bifurcated at the upstream end portion and a pair of airflow meters 61 and a pair of compressors 62 of a turbocharger TC are disposed in the upstream end portion. The intake passage 6 is further provided with an intercooler 63 and a throttle valve 64 downstream of the compressors 62. The throttle valve 64 is actuated by a stepping motor 65 and a throttle position sensor 66 detects the opening of the throttle valve 64. The throttle opening detected by the throttle position sensor 66 is input into the fuel control unit 50 as a feedback information.

An exhaust pipe 9 is connected to exhaust ports EP which are formed in the rotor housings 1 of the respective cylinders and opens to the atmosphere by way of a catalytic converter 92 and a silencer (not shown). Turbines 91 of the turbocharger TC is disposed in the exhaust pipe 9. The catalytic converter 92 treats pollutants in exhaust gas by redox, mainly reduction of NOx in this embodiment.

The fuel supply passage 8 branches off from the hydrogen charging passage 71 upstream of the cock 71A, and is provided with a hydrogen supply valve 81, a solenoid valve 82, a pressure regulator 83, a fuel regulator valve 84, an injection valve (as a timing valve) 20 and a flow control valve 30. The fuel regulator valve 84 is interlocked with an accelerator pedal AP and controls the flow rate of hydrogen gas. Hydrogen gas supplied from the MH reservoir 7 is regulated to about 5 atm (3 to 7 atm) by the pressure regulator 83 and is fed to the hydrogen ports HP of the respective cylinders F and R by way of the fuel regulator valve 84, the injection valve 20 and the flow control valve 30. A pressure sensor 54 detects the pressure of the hydrogen gas in the fuel supply passage 8 between the pressure regulator 83 and the fuel regulator valve 84 and a temperature sensor 58 detects the temperature of the hydrogen gas in the fuel supply passage 8 between the pressure regulator 83 and the fuel regulator valve 84. A position sensor 55 detects the opening of the fuel regulator valve 84. The output signals of the sensors 54, 58 and 55 are input into the fuel control unit 50. The flow control valve 30 is opened and closed by a stepping motor 40 and a position sensor 41 detects the opening of the flow control valve 30. The opening of the flow control valve 30 detected by the position sensor 41 is input into the fuel control unit 50 as feedback information.

Figure 5:
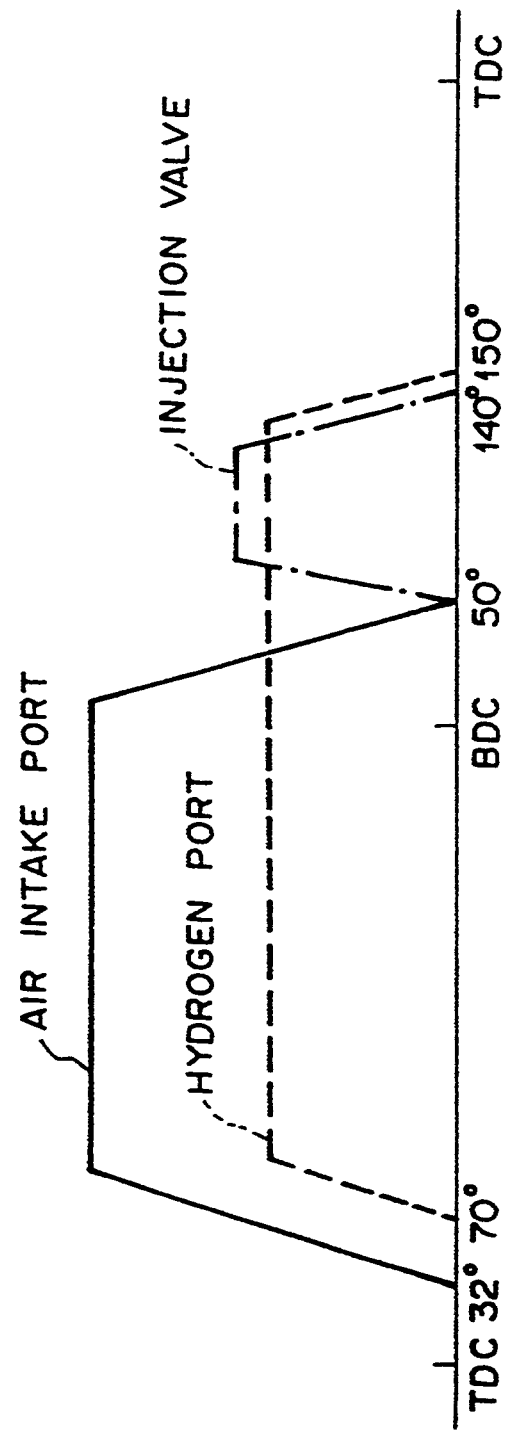
FIG. 5 is a view for illustrating the opening period of the ports.

The air intake port KP and the hydrogen port HP which are formed in the intermediate housing 3 are communicated with each of the working chambers 4 in the timing shown in FIG. 5 as the rotor 2 rotates. That is, the air intake port KP opens crank angle 32° after TDC at the end of the exhaust stroke, and the hydrogen port HP opens slightly later than the air intake port KP the crank angle 70° after TDC at the end of the exhaust stroke. The air intake port KP closes 50° after BDC at the end of the intake stroke and the hydrogen port HP closes 150° after BDC later than the air intake port KP by about 100°. That is, the air intake port KP is open 288° from 32° after TDC to 50° after BDC and the hydrogen port HP is open 370° from 70° after TDC to 150° after BDC.

Figure 4:
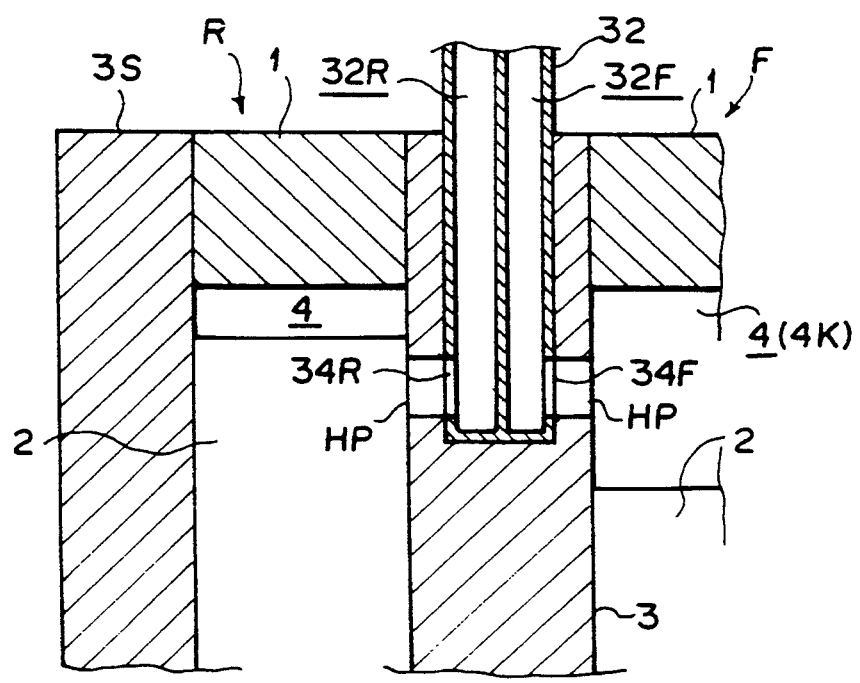
FIG. 4 is a cross-sectional view taken along line B—B in FIG. 2.

The arrangement of the injection valve 20 and the flow control valve 30 will be described with reference to FIGS. 2 and 4, hereinbelow.

Figure 2:
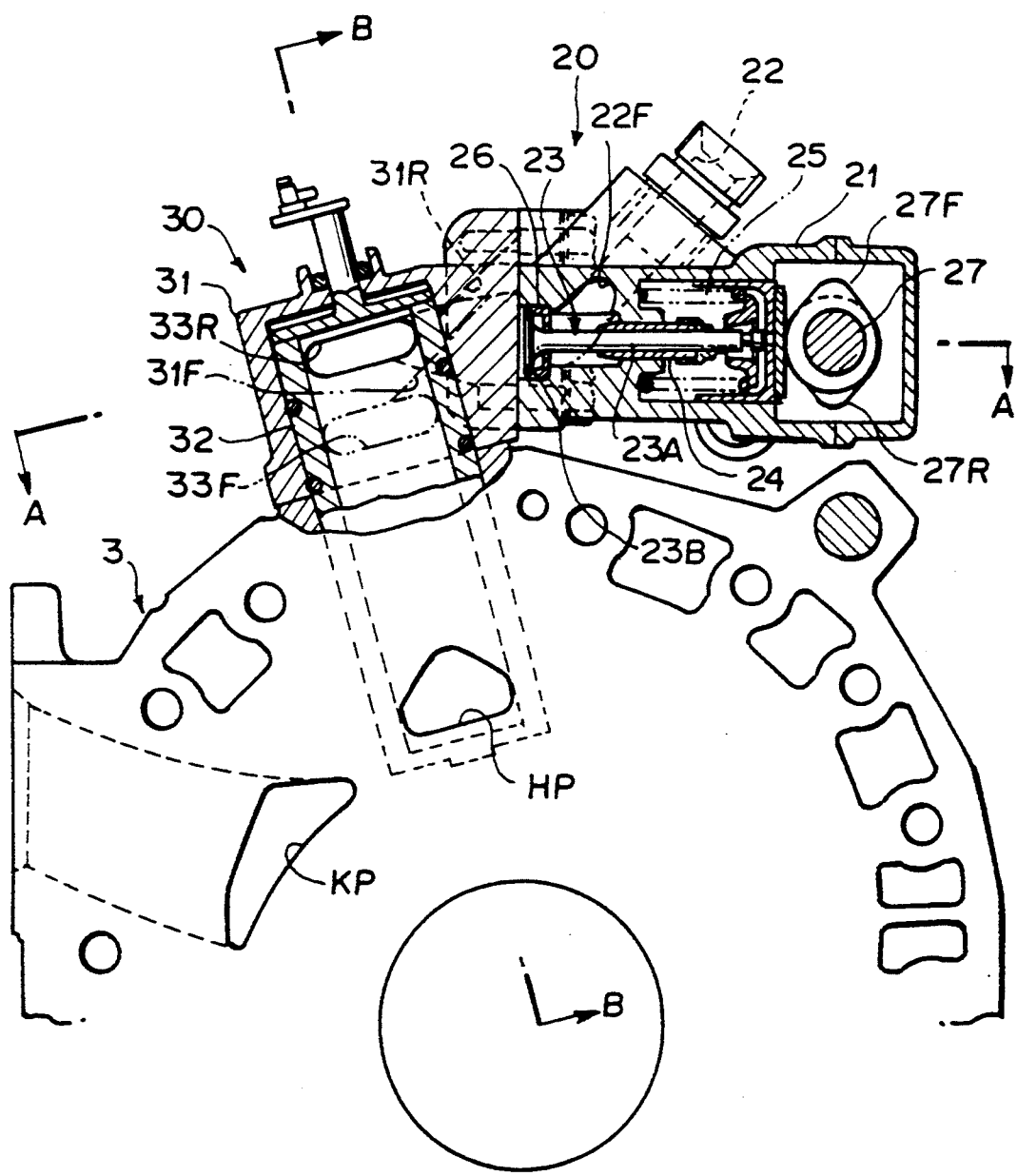
FIG. 2 is an enlarged cross-sectional view showing the injection valve and the flow control valve.

FIG. 2 shows the intermediate housing 3 as viewed from the working chamber 4 of the front cylinder F (the right side in FIG. 1). As shown in FIG. 2, a casing 31 of the flow control valve 30 is fixed to the outer surface of the intermediate housing 3 near the hydrogen port HP, and the injection valve 20 is mounted on a side of the casing 31. In FIG. 2, the flow control valve 30 is in a cross-section taken along its central axis while the injection valve 20 is in a cross-section taken along the central axis of a puppet valve 23.

The flow control valve 30 is a so-called rotary valve which changes the effective cross-sectional area of a passage by rotating a cylindrical valve member having openings. That is, the flow control valve 30 comprises a cylindrical valve member 32 which is rotatably received in the intermediate housing 3 at its lower end and is rotatably received in the casing 31 at its upper end.

Figure 3:
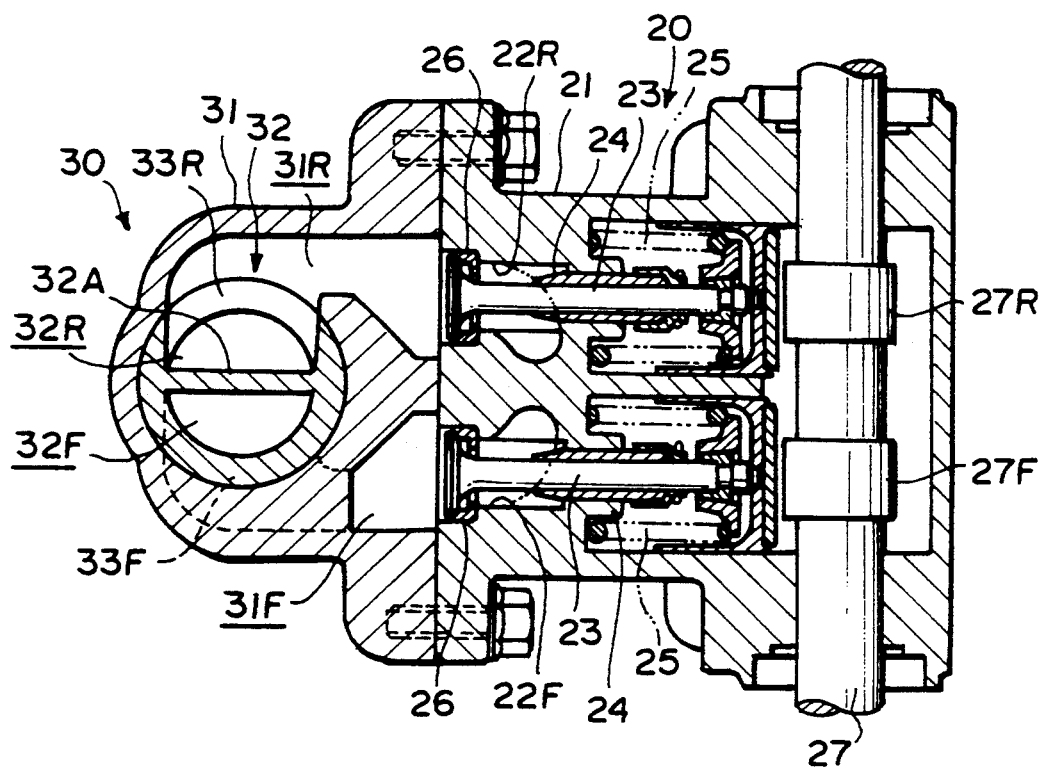
FIG. 3 is a cross-sectional view taken along line A—A in FIG. 2.

As shown in FIG. 3, which is a cross-sectional view taken along line A—A in FIG. 2, the cylindrical valve member 32 has a partition wall 32A which extends diametrically and longitudinally in the inner space thereof. The partition wall 32A divides the inner space of the cylindrical valve member 32 into two passages 32F and 32R which respectively lead to the front and rear cylinders F and R. A pair of slits 33F and 33R which respectively communicate with the passages 32F and 32R are formed on opposite sides of the upper end portion of the cylindrical valve member 32 received in the casing 31 and extend in the circumferential direction of the valve member by a predetermined angle. The slits 33F and 33R are spaced from each other in the longitudinal direction of the valve member 32. As shown in FIG. 4, which is a cross-sectional view taken along line B—B in FIG. 2, the upper end portion of the valve member 32, which is received in the intermediate housing 3, reaches the hydrogen ports HP and is provided with a pair of openings 34F and 34R which respectively communicates the passages 32F and 32R in the valve member 32 with the hydrogen ports HP in the cylinders F and R. Reference numeral 3S denotes an outer side housing.

A pair of passages 31F and 31R are formed in the casing 31 and open at portions which are adapted to be opposed to the slits 33F and 33R, respectively. The open ends of the passages 31F and 31R are shaped to conform to the slits 33F and 33R. By rotating the cylindrical valve member 32, the area over which the open end of each of the passages 31F and 31R overlaps with the corresponding slits 33F and 33R can be changed, and the effective open area and the flow rate can be thus changed. FIG. 3 shows the state that the open ends of the passages 31F and 31R and the slits 33F and 33R are completely aligned with each other and the flow rate is maximized. The passages 31F and 31R and the slits 33F and 33R are formed so that the effective open areas for the front and rear cylinders F and R are equal to each other for any position of the cylindrical valve member 32. The valve member 32 is driven by the stepping motor 40 under control of the fuel control unit 50 as described above.

The passages 31F and 31R in the casing 31 are separately open to the side surface of the casing 31 on which the injection valve 20 is mounted and respectively communicate with passages 22F and 22R in the injection valve 20 as will be described later.

As shown in FIG. 3, the injection valve 20 has the passages 22F and 22R which open at portions opposed to the open ends of the passages 31F and 31R in the casing 31 of the flow control valve 30, and a puppet valve 23 is provided at the open end of each of the passages 22F and 22R. The passages 22F and 22R merge into a single passage 22 upstream of the puppet valves 23 and the fuel supply passage 8 is connected to the passage 22.

The puppet valve 23 has a valve stem 23A which is slidable fit in a guide 24 fixed to a housing 21. A valve face 23B is provided on one end of the valve stem 23A and the valve stem 23A is urged by a spring 25 toward a valve seat 26 in a position in which the valve face 23B is in close contact with the valve seat 26 to close the corresponding passage in the injection valve 20. When the valve face 23B is moved away from the valve seat 26 overcoming the force of the spring 25, the corresponding passage in the injection valve 20 is opened.

A camshaft 27 is supported for rotation in the housing 21 behind the valve stem 23A. The camshaft 27 is provided with cams 27F and 27R which are associated with the puppet valves 23 to open and close the passages 22F and 22R in the injection valve 20 as the camshaft 27 rotates. As shown in FIG. 1, the camshaft 27 is connected to the eccentric shaft 11 of the engine by way of a chain or timing belt 12 to be rotated in synchronization with the eccentric shaft 11, whereby the puppet valves 23 are opened and closed in a predetermined timing in synchronization with rotation of the eccentric shaft 11 or the engine. The cams 27F and 27R are formed on the camshaft 27 at 180° to each other like the difference in phase between the respective cylinders F and R.

With the arrangement of the flow control valve 30 and the injection valve 20 describe above, supply of hydrogen gas to the hydrogen port HP determines on the valve timing of the injection valve 20 and the amount of hydrogen gas to be supplied to the hydrogen port HP can be controlled by the flow control valve 30. The puppet valve 23 of the injection valve 20 opens simultaneously with closure of the air intake port KP (50° after BDC) and closes 140° after BDC substantially simultaneously with closure of the hydrogen port HP. That is, the puppet valve 23 is open 90° from 50° after BDC to 140° after BDC.

Since the puppet valves 23 opens and closes at predetermined crank angles independently from the engine speed, hydrogen gas supplying time changes with the engine speed. Accordingly, in order to keep a predetermined air-fuel ratio, the flow rate of hydrogen gas is changed according to the engine speed by the flow control valve 30. That is, the cross-sectional area of the passage is set so that the flow rate of hydrogen gas with the flow control valve 30 full opened gives the predetermined air-fuel ratio in the high engine speed range, and the flow control valve 30 is closed to reduce the flow rate according to the engine speed so that the predetermined air-fuel ratio is obtained. The flow control valve 30 is provided between the hydrogen port HP and the air intake port KP close to the hydrogen port HP, and accordingly there is small dead volume between the flow control valve 30 and the hydrogen port HP, which leads to high response to control.

The operation of the rotary piston engine of this embodiment will be described, hereinbelow.

The pressure of hydrogen gas supplied from the MH reservoir 7 is regulated to a predetermined pressure (about 5 atm) by the pressure regulator 83 and the amount of hydrogen gas to be supplied is controlled by the fuel regulator valve 84 which is interlocked with the accelerator pedal AP. The fuel control unit 50 knows the amount of hydrogen gas supplied on the basis of the opening of the fuel regulator valve 84 detected by the position sensor 55, the pressure of hydrogen gas detected by the pressure sensor 54 in the fuel supply passage 8, and the temperature of hydrogen gas detected by the temperature sensor 58, and controls the throttle valve 63 in the intake passage 6 according to the amount of hydrogen gas so that air is supplied to the air intake port KP in an amount that provides the predetermined air-fuel ratio. Further, the fuel control unit 50 controls the flow control valve 30 on the basis of the engine speed detected by the engine speed sensor 51 for the purpose of fine adjustment of the amount of hydrogen gas supplied.

As described above, the air intake port KP opens 32° after TDC at the end of the exhaust stroke and then the hydrogen port HP opens 70° after TDC. At this time, though air flows into the working chamber 4K in the intake stroke through the air intake port KP, the puppet valve 23 is still kept closed and hydrogen gas is not supplied. Thereafter, simultaneously with closure of the air intake port KP 50° after BDC, the puppet valve 23 opens and hydrogen gas flows into the working chamber 4 at the beginning of the compression stroke through the hydrogen port HP which has opened.

The air intake port KP and the hydrogen port HP formed in the intermediate housing 3 come to open to the working chamber in the intake stroke after the leading side seal passes them, and accordingly, the opening period and the opening area are related to each other. That is, when the opening period is limited, the opening area is also limited. In order to enlarge the opening area over a certain limit, the opening period must be elongated. In this embodiment, since supply of hydrogen gas through the hydrogen port HP depends upon the opening period of the injection valve 20, the shape and area of the hydrogen port HP may be set so that the injection valve 20 opens while the hydrogen port HP is open and a sufficient amount of hydrogen gas can be supplied through the hydrogen port HP.

Though, in the embodiment described above, the air intake port KP is kept open for 288°, the hydrogen port HP is kept open for 370° and the injection valve 20 is kept open for 90°, the opening area of the hydrogen port HP and the opening period of the injection valve 20 may be set according to the air charging amount for a given operating condition of the engine, which can be determined according to the opening period of the air intake port KP, so that hydrogen gas can be supplied in such an amount that provides a required air-fuel ratio. In the rotary piston engine, such a condition can be ensured by causing the air intake port KP to open slightly after TDC, setting the opening period of the air intake port KP between 230° to 320°, causing the hydrogen port HP to open slightly after opening of the air intake port KP and setting the opening period of the hydrogen port HP longer than that of the air intake port KP. The opening period of the injection valve 20 may be set to a period sufficient to supply a required amount of hydrogen gas. That is, the opening period of the injection valve 20 may be suitable set between about 60° to 130° so long as the injection valve 20 opens near the closure of the air intake port KP so that hydrogen gas does not reverse into the air intake port KP and closes before the pressure in the working chamber becomes higher than the hydrogen gas supplying pressure (i.e., before the middle of the compression stroke) and before the hydrogen port HP closes. When the opening period of the injection valve 20 is thus set, the ratio of the opening period of the injection valve 20 to that of the air intake port KP is about 1:3.

In the engine having the arrangement described above, hydrogen gas is supplied through the hydrogen port HP during 90° between 50° after BDC at which the injection valve 20 opens and 140° after BDC at which the injection valve 20 closes. In the rotary piston engine, the crank angle between the TDC and the BDC is 270° and is longer than in the reciprocating engine (180°), and accordingly, each stroke progresses more slowly than in the reciprocating engine and the pressure in the working chamber slowly increases in the compression: stroke. Due to this fact together with the fact that the shape and/or the opening area of the hydrogen port HP are set so that an opening area sufficient to supply a desired amount of hydrogen gas can be obtained at any time in the opening period thereof, a required amount of hydrogen gas can be introduced into the working chamber at the beginning of the compression stroke even if the hydrogen gas supplying pressure is as low as about 5 atm. Further since the hydrogen gas is supplied after closure of the air intake port KP, hydrogen gas supplied into the working chamber cannot flow into the intake passage, whereby backfiring cannot occur. That is, in this embodiment, hydrogen gas can be efficiently charged in a large amount at the beginning of the compression stroke after closure of the air intake port KP, and accordingly, the engine output can be increased while backfiring can be prevented. Further since, in the rotary piston engine, the four strokes take place while the working chamber is moving, the intake stroke takes place in a position which is different from the position where the power stroke takes place and is relatively low in temperature and accordingly hydrogen gas can be mixed with air for a long time without possibility of premature ignition. This permits operation of the engine with lean air-fuel mixture where the excess air ratio λ (=actual air-fuel ratio/stoichiometric air-fuel ratio) is not smaller than 2. As a result, little NOx is formed. Since the hydrogen engine inherently forms neither carbon dioxide or poisonous unburned component, an almost completely pollution-free engine can be realized in accordance with this embodiment.

Other embodiments of the present invention will be described hereinbelow.

Figure 6:
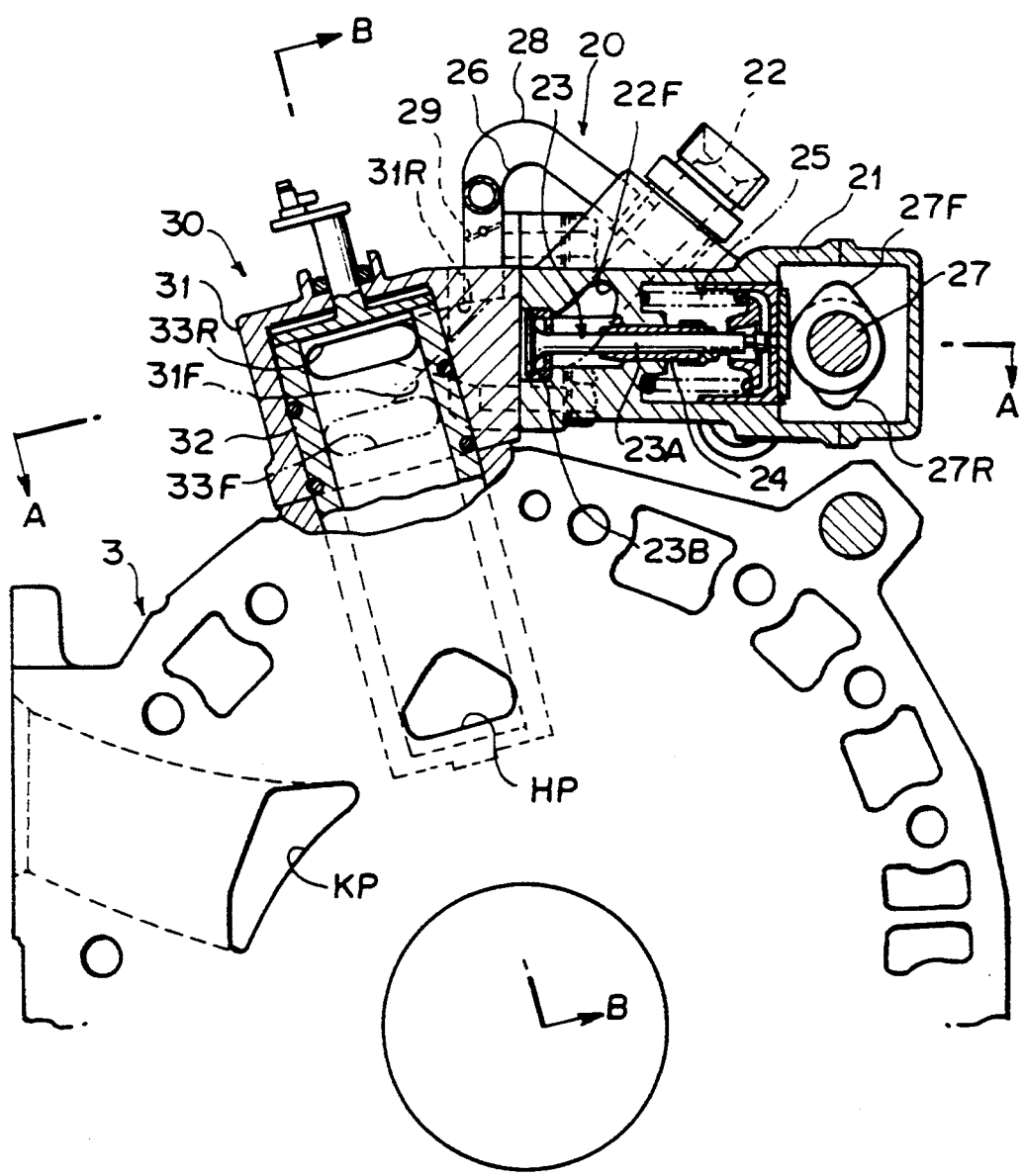
FIG. 6 is an enlarged cross-sectional view showing the injection valve and the flow control valve employed in another embodiment of the present invention.

The embodiment shown in FIG. 6 differs from the first embodiment in that a bypass passage 28 which bypasses the puppet valves 23 of the injection valve 20 is provided.

That is, the bypass passage 28 branches off from the passage 22 into which the passages 22F and 22R in the injection valve 20 merge together and is directly connected to the passages 31F and 31R in the flow control valve 30. The bypass passage 28 is provided with an on-off valve 29.

When the pressure of hydrogen gas from the MH reservoir 7 is low like when the engine is started up or when the engine is cold, the on-off valve 29 is opened to supply hydrogen gas through the bypass passage 28 over the entire period that the hydrogen port HP is open, thereby improving the hydrogen gas charging efficiency.

Figure 7:
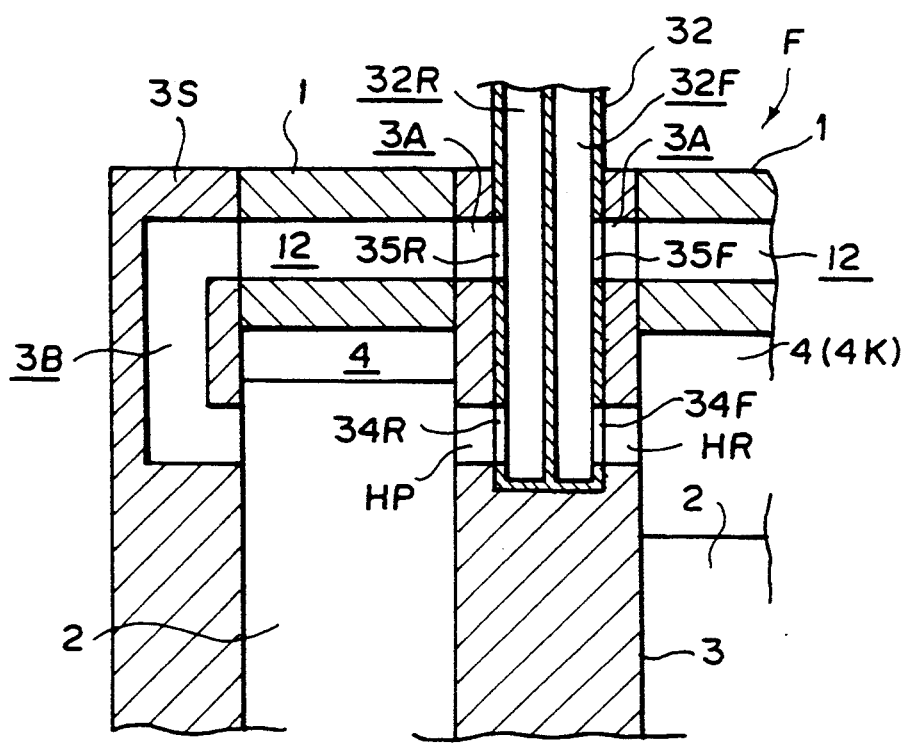
FIG. 7 is an enlarged cross-sectional view showing the flow control valve employed in still another embodiment of the present invention.

The embodiment shown in FIG. 7 differs from the first embodiment in that an additional hydrogen port HP is provided in the side housing 3S of each cylinder.

That is, an additional hydrogen port HP is formed in the side housing 3S at a portion opposed to the hydrogen port HP in the intermediate housing 3. The additional hydrogen port HP is communicated with the passage 32F (or 32R) in the cylindrical valve member 32 through a passage 3B formed in the side housing 3S, a passage 12 formed in the rotor housing 1, a passage 3A formed in the intermediate housing 3 and an opening 35F (or 35R) formed in the valve member 32. In this embodiment, the effective opening area of the hydrogen port HP is enlarged and at the same time, since hydrogen gas is supplied through both the hydrogen ports HP which are opposed to each other, hydrogen gas is better mixed with air.

Figure 8:
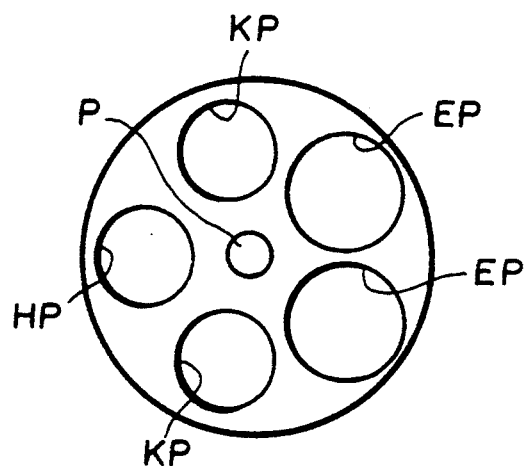
FIG. 8 is a view showing the arrangement of the ports in still another embodiment in which the present invention is applied to a reciprocating engine.
Figure 9:
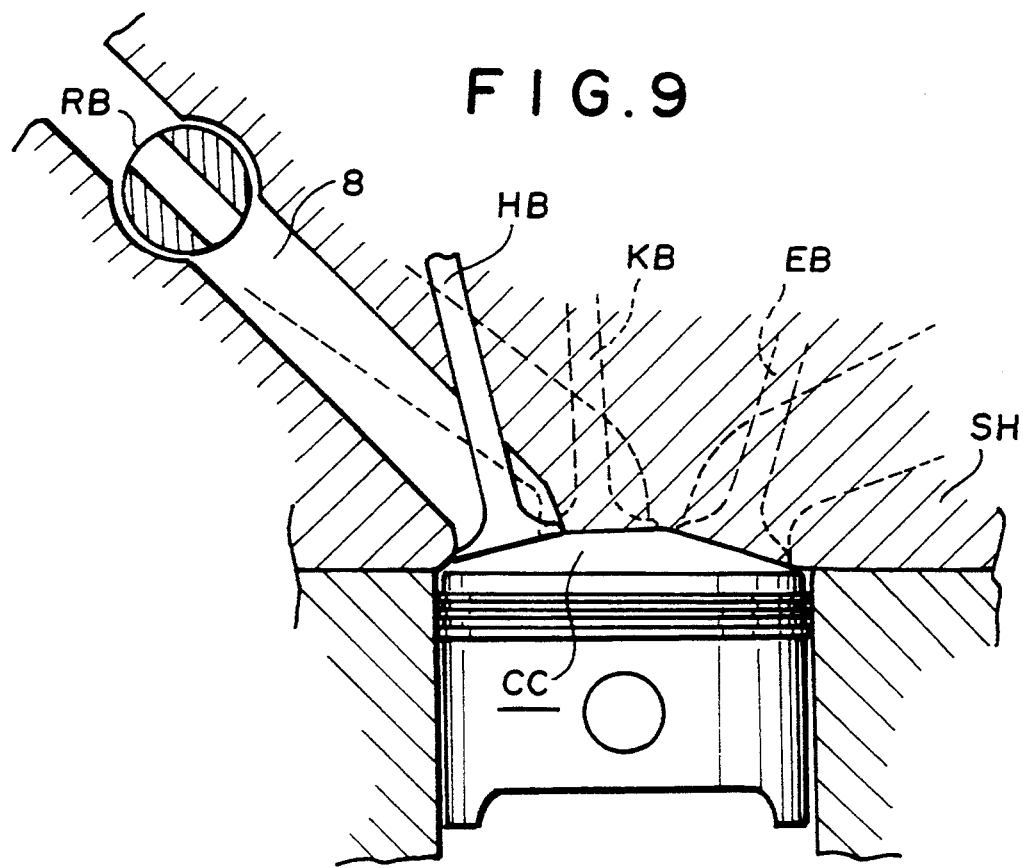
FIG. 9 is a cross-sectional view of the embodiment.

In the embodiments shown in FIGS. 8 and 9, the present invention is applied to a reciprocating engine.

In this embodiment, a pair of air intake ports KP and a pair of exhaust ports EP are formed in the cylinder head CH to open to the combustion chamber CC, and a single hydrogen port HP is formed between the air intake ports KP. The air intake ports KP, the exhaust ports EP and the hydrogen port HP are respectively provided with puppet valves KB, EB and HB. The fuel supply passage 8 which leads to the hydrogen port HP is provided with a rotary valve RB as the timing valve. The puppet valve HB provided in the hydrogen port HP is arranged to be lifted by a large distance for a long time so that a sufficient effective opening area can be provided and the actual hydrogen gas supplying timing is governed by the rotary valve RB. P in FIG. 8 denotes a spark plug. With this arrangement, hydrogen gas can supplied in proper timing while a sufficient opening area can be ensured, whereby a proper amount of hydrogen gas can be supplied according to the operating condition of the engine. Further, limitations in setting the opening area of the passages and the opening timing and the lift of the puppet valve HB in the hydrogen port HP are reduced and the degree of freedom in design can be increased.

In order to prevent premature ignition, it is preferred that the temperature of the engine wall defining the combustion chamber be as low as possible during the intake stroke and the compression stroke. However when the temperature of the engine wall is low during the power stroke, the engine output power reduces.

Figure 10:
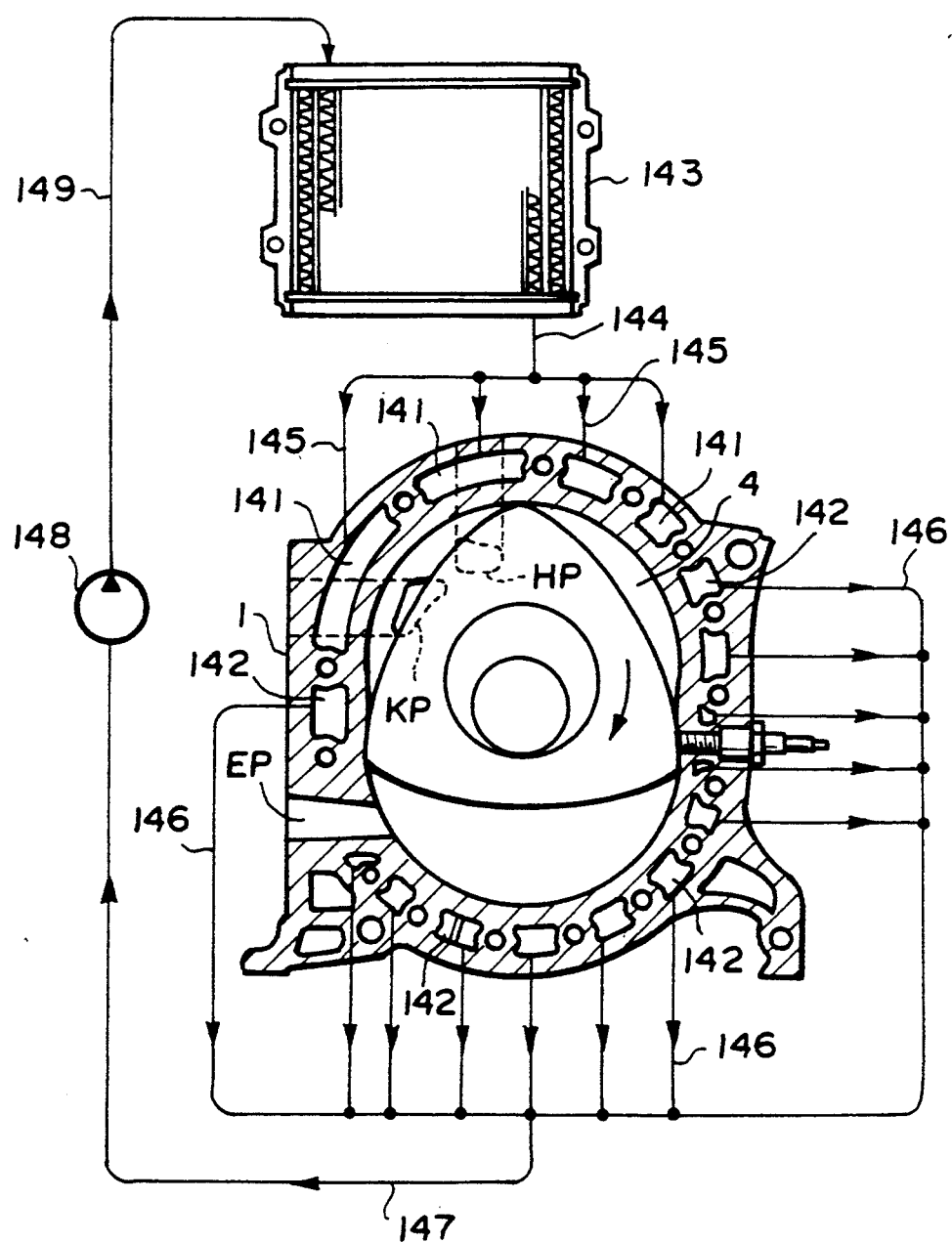
FIG. 10 is a schematic view showing the engine cooling circuit employed in still another embodiment of the present invention.

In the embodiment shown in FIG. 10, a rotary piston engine is provided with an engine cooling system in which engine coolant discharged from a radiator is supplied to the portion of the water jacket which is opposed to the portion of the engine where the intake stroke and the compression stroke take place in preference to the portion of the water jacket which is opposed to the portion of the engine where the power stroke and the exhaust stroke take place.

With reference to FIG. 11, where the parts analogous to those shown in FIGS. 1 and 2 are given the same reference numerals, the rotary piston engine is provided with a water jacket which comprises an upstream water jacket 141 which is opposed to the portion of the engine where the intake stroke and the compression stroke take place and downstream water jacket 142 which is opposed to the portion of the engine where the power stroke and the exhaust stroke take place. The upstream water jacket 141 is connected to the lower tank of a radiator 143 through a plurality of branch lines 145, and the downstream water jacket 142 is connected to the downstream end of the upstream water jacket 141. Further, the downstream water jacket 142 is connected to a return line 147 by way of a plurality of branch lines 146. The return line 147 is connected to a water pump 148 which is connected to the upper tank of the radiator 143 by way of an inlet line 149.

With this arrangement, engine coolant which has just passed through the radiator 143 and is relatively cold is supplied to the portion of the water jacket which is opposed to the portion of the engine where the intake stroke and the compression stroke take place and the air-fuel mixture in the working chambers on the intake stroke and the compression stroke is effectively cooled, whereby premature ignition of the air-fuel mixture can be effectively prevented.

Still another embodiment of the present invention will be described hereinbelow.

Figure 12:
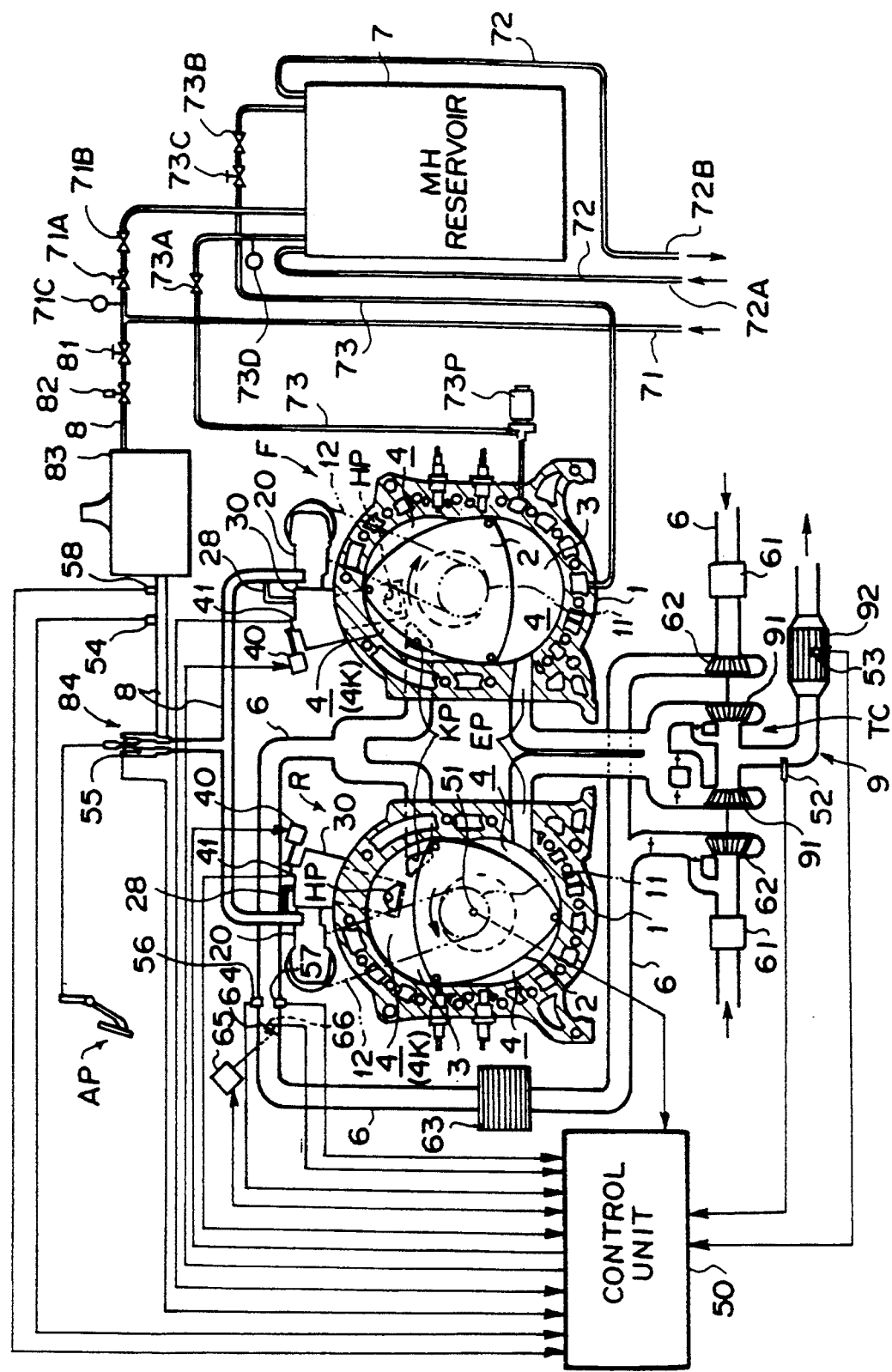
FIG. 12 is a view similar to FIG. 1 but showing the embodiment shown in FIG. 11.

In FIGS. 11 to 13, the part analogous to those described in the embodiments described above are given the same reference numerals and will be described here. The rotary piston engine of this embodiment mainly differs from those described above in that it is provided with an auxiliary driving means.

As shown in FIG. 11, the eccentric shaft 11 is connected to a transmission 280 by way of a selsyn dynamo 260 and a clutch 270. As shown in FIG. 13, the selsyn dynamo 260 has a rotor 216 which is connected to the eccentric shaft 11 and functions as a flywheel. A revolving field pole 267 is provided on the outer surface of the rotor 216, and a filed portion 68 and a stator portion 269 are respectively disposed on the inner and outer periphery of the revolving field pole 267.

The revolving field pole 267 comprises a first pole core 267A having a plurality of teeth projecting toward the engine body at regular intervals, a second pole core 267B having a plurality of teeth each of which is positioned between the teeth of the first pole core 267A and projects toward the transmission, and a non-magnetic ring 267C which connects the first and second pole cores 267A and 267B.

The field portion 268 comprises a field core 268A fixed to a rear housing 213 by way of a member which shuts off a magnetic field, and field winding 268B wound around the field core 268A. The field portion 268 is received in the revolving field pole with the outer peripheral surface of the former opposed to the inner peripheral surface of the latter at a small distance therefrom.

The stator portion 269 comprises an annular stator core 269A formed of a plurality of laminated steel plates and a stator winding 269B wound around the stator core 269A. The stator portion 269 is fixed to the inner surface of a stator core housing 214 which is mounted between the rear housing 213 and a clutch housing 215. The stator portion 269 is positioned relative to the revolving field pole 267 so that the inner peripheral surface of the former is opposed to the outer peripheral surface of the latter at a small distance therefrom. The stator winding 269B is in the form of a three-phase distributed winding in a plurality of slits (not shown) formed on the inner peripheral surface of the stator core 269A to extend in circumferential directions.

When the selsyn dynamo 260 is energized in synchronization with revolution of the engine output shaft (the eccentric shaft 11) so that the field winding 268B is energized and the revolving field pole 267 is magnetized in a predetermined polarity while a revolving magnetic field having a predetermined phase to the polarity of the revolving field pole 267 is established, the revolving field pole 267 is continuously applied with magnetic force by the revolving magnetic field and the engine output shaft on which the revolving field pole 267 is mounted is applied with rotational torque. Thus the selsyn dynamo 260 functions as a selsyn motor and when it is energized while the engine is at rest, it starts the engine and when it is energized while the engine is running, it provides additional torque to the engine output shaft. On the other hand, when the selsyn dynamo 260 is de-energized while the engine is running, electromotive force is induced in the stator winding 269B by virtue of the revolving field pole 267 and a battery 290 is charged. The selsyn dynamo 260 operates under the control of the fuel control unit 50 as will be described in detail later.

Reference numerals 52 and 53 in FIG. 12 respectively denotes an O₂sensor disposed in the exhaust passage 9 between the turbocharger TC and the catalytic converter 92 and a temperature sensor which detects the temperature of the catalytic convertor 92.

Figure 14:
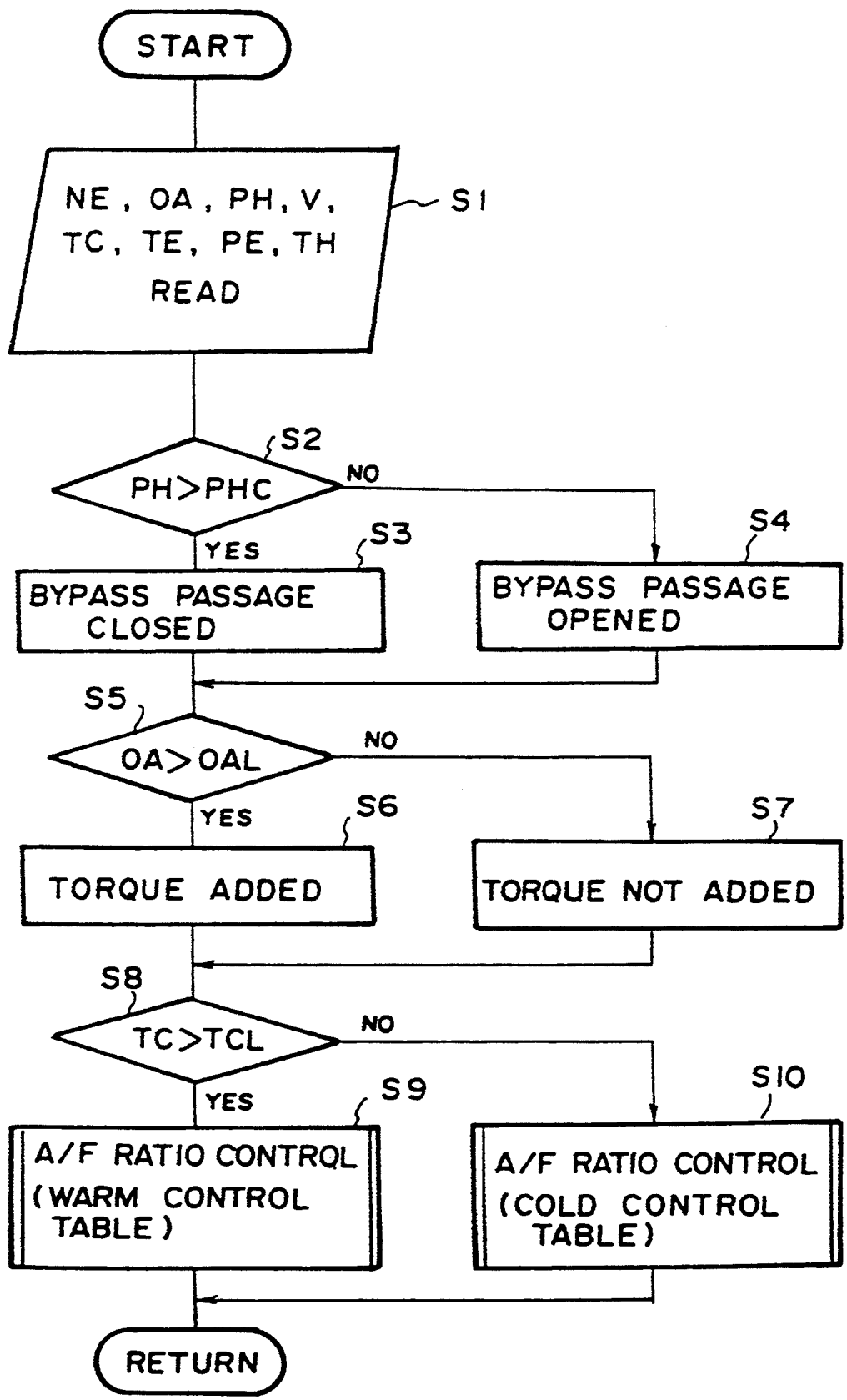
FIG. 14 is a flow chart for illustrating the operation of the control unit.

Control of the on-off valve 29 of the bypass passage 28, the selsyn dynamo 260 and the air-fuel ratio by the control unit 50 will be described hereinbelow. As shown in the flow chart shown in FIG. 14, the control unit 50 detects the operating condition of the engine through the engine speed Ne, the opening OA of the fuel regulator valve 84 (i.e., the amount of depression of the accelerator), the pressure of hydrogen gas PH, the temperature of the hydrogen gas TH, the oxygen concentration in exhaust gas V, the temperature TC of the catalytic convertor 92, the pressure of intake air PE and the temperature of intake air TE detected by the sensors 51, 55, 54, 58, 52, 53 and 57. Then the control unit 50 controls the on-off valve 29 of the bypass passage 28 according to the bypass passage opening and closing control table shown in FIG. 14, controls the selsyn dynamo 260 according to the torque addition control table shown in FIG. 21, and controls the flow control valve 30 and the throttle valve 64. The control unit 50 determines a target air-fuel ratio according to the control table shown in FIG. 16 or 17, determines a target opening of the throttle valve 64 according the air intake passage area table shown in FIG. 23 or 24 on the basis of the target air-fuel ratio and the engine speed, and controls the throttle valve 64 so that the opening of the throttle valve 64 converges on the target opening. Further the control unit 50 determines a target opening of the flow control valve 30 according to the hydrogen passage area table shown in FIG. 18 and controls the flow control valve 30 so that the opening of the flow control valve 30 converges on the target opening.

That is, the control unit 50 first reads the output signals of the sensors described above. (step S1) Then the control unit 50 determines in step S2 whether the pressure of the hydrogen gas PH is higher than a predetermined value PHC. When the answer to the question in step S2 is NO, the control unit 50 controls the on-off valve 29 to open the bypass passage 28. When the bypass passage is opened, hydrogen gas can be supplied to the working chamber, irrespective of opening or closure of the injection valve 20, over the entire period that the hydrogen port HP is open, whereby shortage of hydrogen charge due to poor pressure is compensated for. (step S4) On the other hand, when the pressure of the hydrogen gas PH is higher than the predetermined value PHC, the control unit 50 keeps the bypass passage 28 closed. (step S3)

Figure 20:
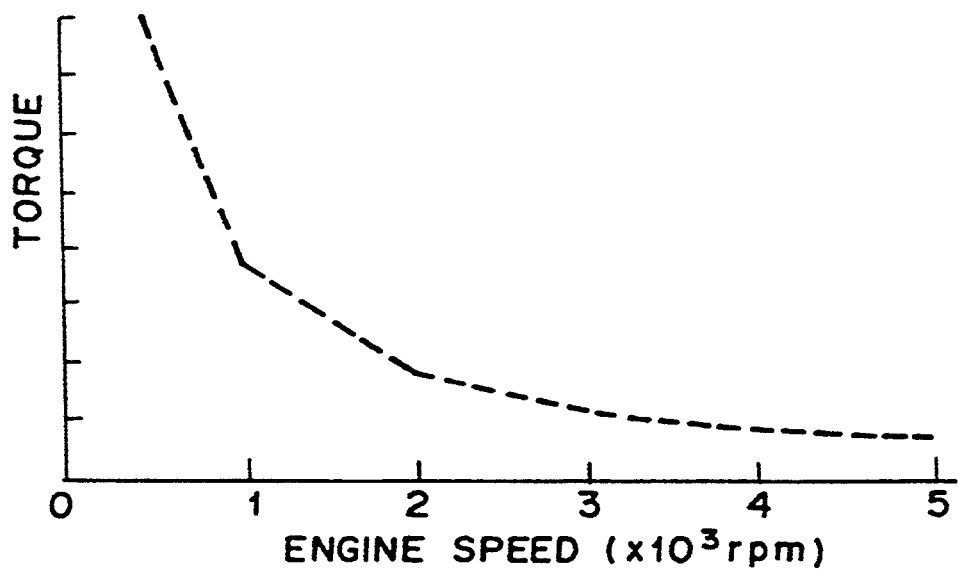
FIG. 20 is a graph showing the relation between the torque of the selsyn dynamo and the engine speed.
Figure 21:
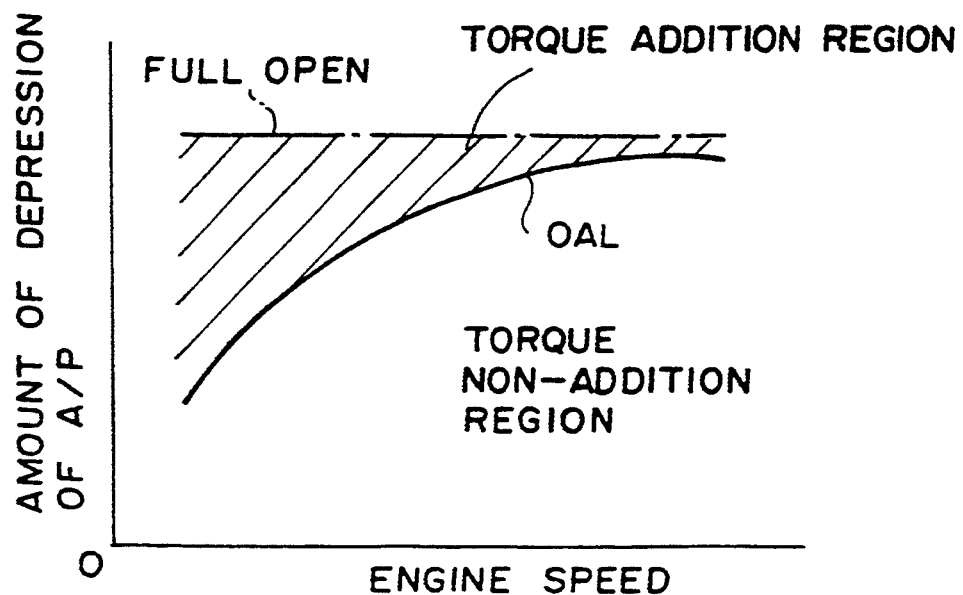
FIG. 21 is a view showing the torque addition control table.
Figure 22:
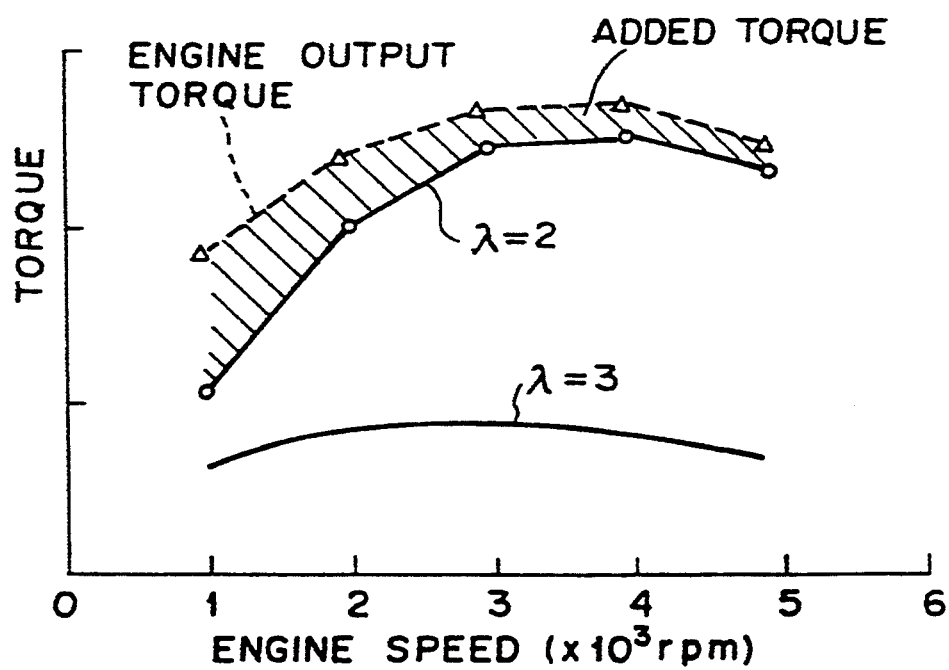
FIG. 22 is a graph showing the engine output characteristic of the engine shown in FIG. 11.

In step S5, the control unit 50 determines whether the amount of depression of the accelerator OA is larger than a threshold value OAL shown in the torque addition control table shown in FIG. 21. When the former is larger than the latter, the control unit 50 operates the selsyn dynamo 260 to add the torque (step S6) and otherwise the control unit 50 does not operate the dynamo 260 (step S7). The selsyn dynamo 260 exerts high torque in the low speed range as shown in FIG. 20. Further the control unit 50 basically causes the selsyn dynamo 260 to operate to assist the engine when the engine operates under heavy load. However in the low engine speed range where the engine output reduces quickly, the control unit 50 causes the selsyn dynamo 260 to operate at relatively light load as shown in FIG. 21. Thus the engine can be operated with the excess air ratio $\lambda$ kept at 2. The resulting engine output characteristic is given by adding the additional torque provided by the selsyn dynamo 260 to the engine output characteristic when the engine operates with the excess air ratio $\lambda$ kept at 2 as shown in FIG. 22. The resulting engine output characteristic shown in FIG. 22 is equivalent to the engine output characteristic when the engine operates with the excess air ratio $\lambda$ kept at 1.

In step S8, the control unit 50 compares the temperature TC of the catalytic convertor 92 with a reference temperature TCL. When the former is higher than the latter, the control unit 50 determines that the engine has been warmed up and determines a target air-fuel ratio according to the warm control table shown in FIG. 16 and controls the throttle valve 64 and the flow control valve 30 so that the air-fuel ratio converges on the target air-fuel ratio. (step S9) Otherwise the control unit 50 determines that the engine is still cold and determines the target air-fuel ratio according to the cold control table shown in FIG. 17 and controls the throttle valve 64 and the flow control valve 30 so that the air fuel ratio converges on the target air-fuel ratio. (step S10)

Figure 16:
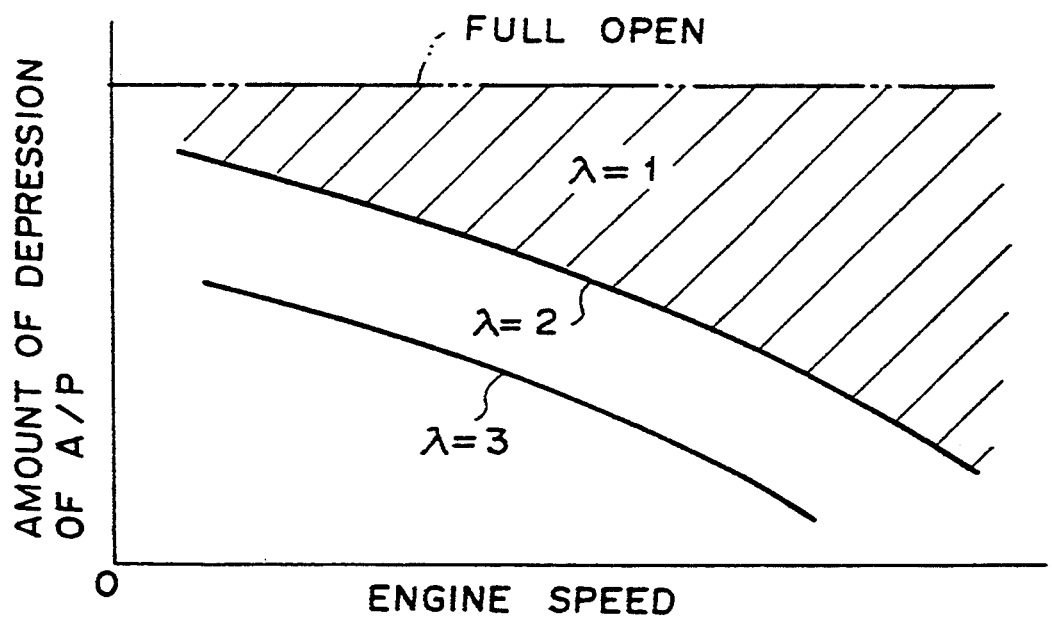
FIG. 16 is a view showing the warm control table.

The air-fuel ratio control according to the warm control table shown in FIG. 16 is effected in the manner shown in FIG. 15. That is, the control unit 50 first detects the engine speed NE, the opening of the fuel regulator valve 84 (the amount of depression of the accelerator) and the residual oxygen concentration in exhaust gas V (the output of the $O_2$ sensor 52). (step S11) Then the control unit 50 determines the target air-fuel ratio according to the warm control table on the basis of the engine speed NE and the amount of depression of the accelerator OA. (step S12) When the target air-fuel ratio $\lambda$ is 1, the control unit 50 determines the target air passage area according to the air passage area control table showing FIG. 23 and sets the opening the throttle valve 64 on the basis of the target air passage area determined. At the same time, the control unit 50 determines the target hydrogen passage according to the hydrogen passage control table showing FIG. 18 and sets the opening of the flow control valve 30 on the basis of the target hydrogen passage. Further the control unit 50 feedback-controls one of the throttle valve 64 and the flow control valve 30 according to the output of the $O_2$ sensor 52 so that the air-fuel ratio $\lambda$ converges on 1. Though either of the throttle valve 64 and the flow control valve 30 may be feedback-controlled, it is preferred that the throttle valve 64 be so controlled since the amount of intake air less affects the engine output power. (step S14) When the target air-fuel ratio $\lambda$ is not 1, the control unit 50 determines the target air passage area according to the air passage area control table show in FIG. 23 and sets the opening of the throttle valve 64 on the basis of the target air passage area determined, and at the same time, the control unit 50 determines the target hydrogen passage according to the hydrogen passage control table shown in FIG. 18 and controls (open control) the flow control valve 30 on the basis of the target hydrogen passage. (step S 15)

In the warm control table shown in FIG. 16, the air-fuel ratio $\lambda$ is set to 1 in a heavy-load high-engine-speed region and is made lean as the engine load is reduced and the engine speed decreases. That is, in the heavy-load high-engine-speed region where the maximum engine output is required, the air-fuel ratio $\lambda$ is set to 1 to increase the engine output.

Figure 18:
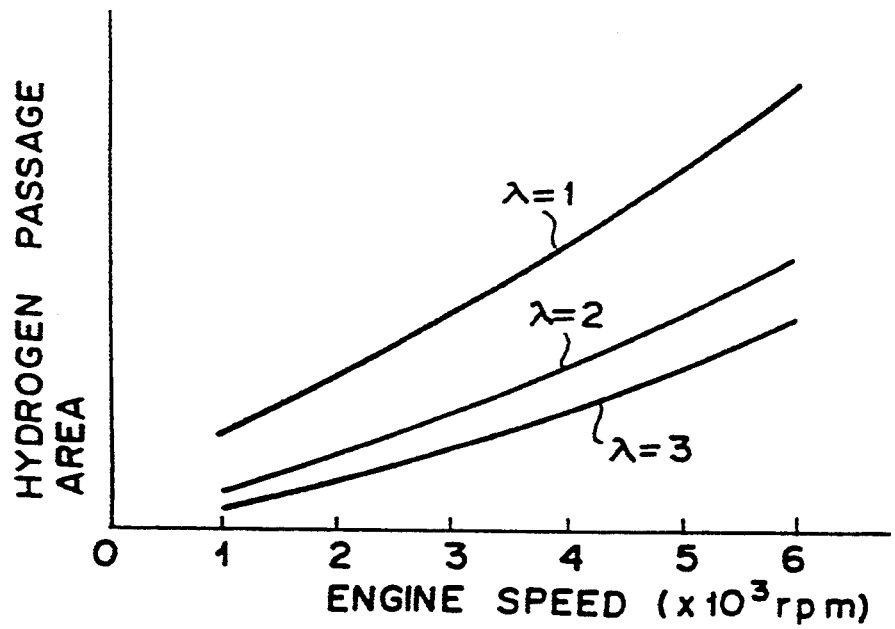
FIG. 18 is a view showing the hydrogen passage area control table.
Figure 19:
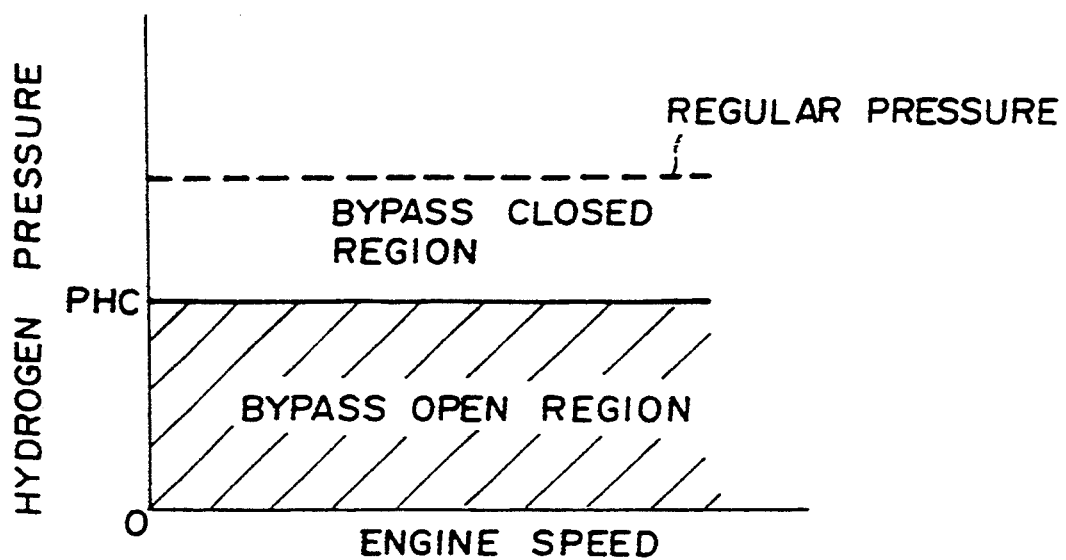
FIG. 19 is a view showing the bypass passage control table.

In the hydrogen passage control table shown in FIG. 18, the hydrogen passage area (the opening of the flow control valve 30) is related to the target air-fuel ratio and the engine speed so that the air-fuel ratio determined according to the warm control table or the cold control table is realized. Since the opening of the flow control valve 30 which will provide a given air-fuel ratio changes with the engine speed, the opening of the flow control valve 30 increases as the engine speed increases.

Figure 23:
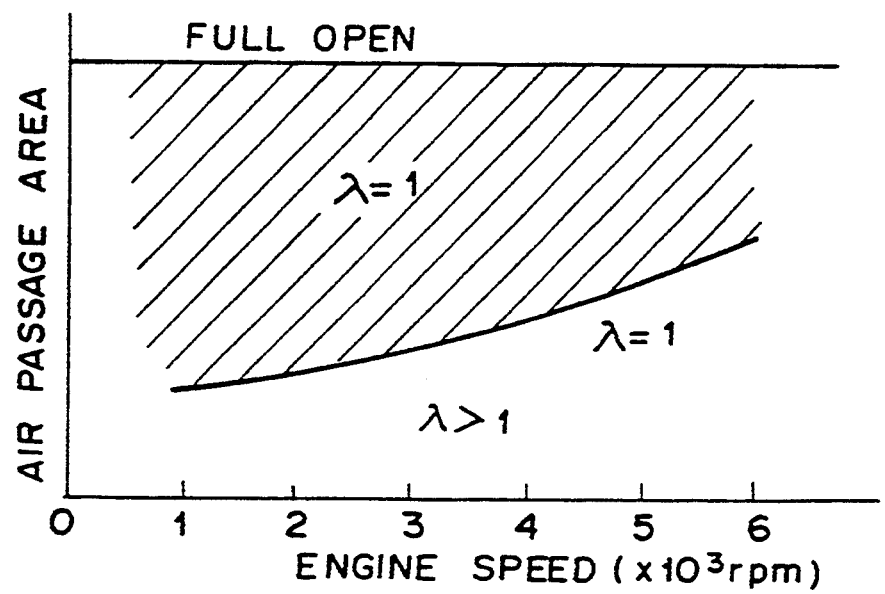
FIG. 23 is a view showing the air passage area control table for a warm engine.
Figure 24:
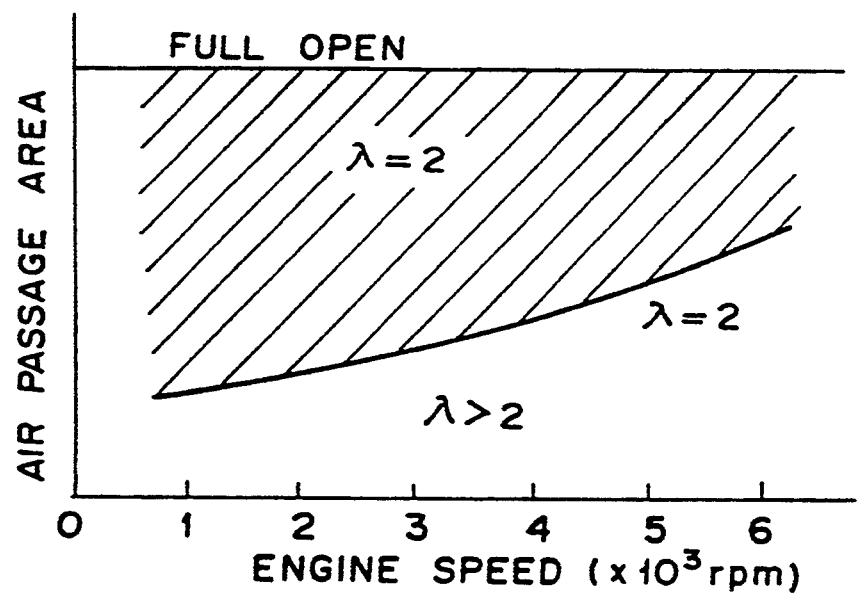
FIG. 24 is a view showing the air passage area control table for a cold engine.

In accordance with the air passage area control table shown in FIG. 23, the opening of the throttle valve 64 is changed in proportion to the amount of depression of the accelerator in the heavy-load high-engine-speed region where the air fuel ratio $\lambda$ is set to 1 and the opening of the throttle valve 64 is fixed irrespective of the amount of depression of the accelerator in the region where the air-fuel ratio λ is set to be larger than 1.

NOx formed when the air-fuel ratio λ is set to 1 is reduced into non-toxic substance by the catalytic converter 92.

The air-fuel ratio control according to the cold control table applied when the temperature of the TC catalytic convertor is lower than the reference value TC1 is the same as the control effected when the air-fuel ratio λ is set to be larger than 1 according to the warm control table. That is, the control unit 50 determines the target air-fuel ratio according to the control table on the basis of the engine speed and the amount of depression of the accelerator, and then determines the opening of the throttle valve 64 according to the air passage area control table shown in FIG. 24 on the basis of the target air-fuel ratio and the engine speed. At the same time, the control unit 50 controls (open control) the flow control valve 30 on the basis of the hydrogen passage area determined according to the hydrogen passage control table shown in FIG. 18.

Figure 17:
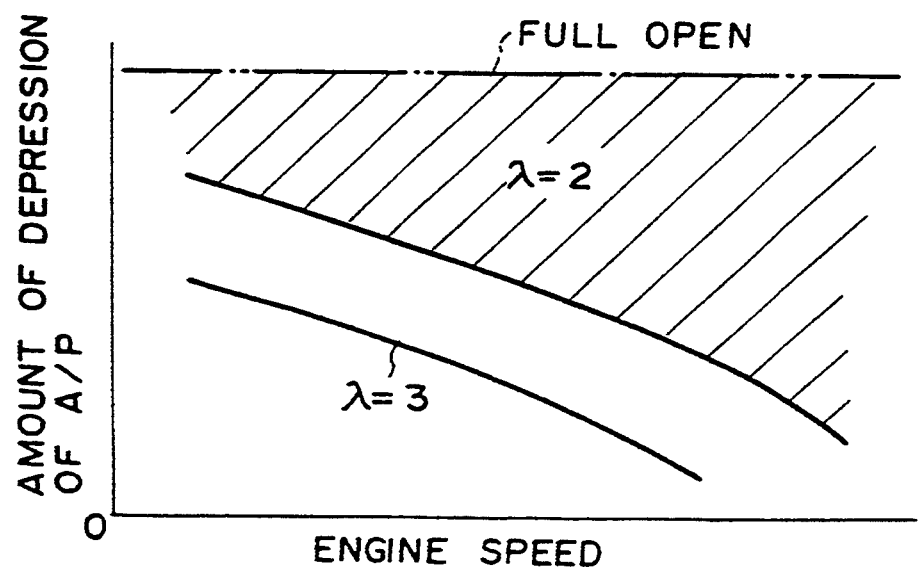
FIG. 17 is a view showing the cold control table.

In accordance with the cold control table shown in FIG. 17, the air-fuel ratio λ is set to be 2 in heavy-load high-engine-speed region and is made leaner as the engine load is reduced and the engine speed is lowered. The air flow control valve 30 is open-controlled over the entire operating region. In accordance with the air passage area control table shown in FIG. 24, the airfuel ratio λ is set to be 2 in the heavy-load low-engine-speed region. In the region where the air-fuel ratio λ is set to be 2, the opening of the throttle valve 64 is changed in proportion to the amount of depression of the accelerator and in the region where the air-fuel ratio λ is set to be larger than 2, the opening of the throttle valve 64 is fixed irrespective of the amount of depression of the accelerator. The throttle valve 64 is open-controlled over the entire operating region.

When λ is not larger than 2, the combustion velocity is low and the combustion temperature is low, but the engine is quickly warmed up due to large thermal loss and little NOx is formed. Further since when the engine operates under heavy load, the selsyn dynamo 260 assists the engine, an engine output characteristic which is substantially equivalent to the engine output characteristic when the engine operates with the excess air ratio λ kept at 1 can be obtained even when the excess air ratio λ kept at 2.

With the arrangement described above, when the engine is cold, the engine is operated with lean air-fuel ratio not smaller than 2 to quickly warm up the engine. When the engine is warm, the excess air ratio λ is set to not smaller than 2 in the light-load low-engine-speed region where the engine output need not be large, thereby suppressing formation of NOx. In the heavy-load high-engine-speed engine-speed region while the engine is warm, the excess air ratio λ is set to to increase engine output. Further in the heavy-load region, the engine output can be increased by the assistance of the selsyn dynamo. NOx formed when the air fuel ratio λ is set to 1 is reduced into non-toxic substance by the catalytic convertor 92.

Hereinafter, an alternative embodiment according to the present invention will be described in detail with reference to FIGS. 25, 26 and 27.

A hydrogen engine according to the embodiment of the present invention will be used as an engine for an automobile. As shown in FIG. 25, the hydrogen engine comprises an engine 301, a hydrogen discharging tank 302 containing a hydrogen storage alloy, the tank 302 being connected to the engine 301, a heating medium passage 303 through which a heating medium for heating the hydrogen storage alloy is caused to flow, and a hydrogen supply passage 304 through which hydrogen gas discharged from the hydrogen discharging tank 302 is supplied to the engine 301 as fuel. The engine 301 is constructed as a combustion engine which is driven by the hydrogen gas as fuel. The hydrogen discharging tank 302 is a well known type of tank, and is in the form of a hermetic container containing the hydrogen storage alloy such as $TiFeH$, or $LaNi_5H_6$ therein. When the hydrogen storage alloy is heated (or partial pressure of hydrogen is decreased), hydrogen is released therefrom, and when the hydrogen storage alloy is cooled (or partial pressure of hydrogen is increased), and hydrogen is occluded therein.

The heating medium passage 303 is connected to an engine cooling water passage (not shown) formed so that the engine 301 is cooled. After the engine 301 is started, a water pump (not shown) provided in the engine 301 is operated so that the engine cooling water (i.e., the heating medium) flows through the heating medium passage 303.

A pressure tank 305 is disposed in the middle of the hydrogen supply passage 304 wherein hydrogen gas discharged from the hydrogen discharging tank 302 is temporarily stored therein so that the pressure of hydrogen gas is increased to a predetermined value (i.e., pressure which is high enough to start the engine 301).

The heating medium passage 303 has a heating water supply passage 303a which connects the engine 301 to the hydrogen discharging tank 302, and a return passage 303b which connects the hydrogen discharging tank 302 to the engine 301, and bypass passage 306 which directly connects the supply passage 303a to the return passage 303b. A pump 307, whereby the heating medium is caused to flow through the heating medium passage 303, is disposed in the middle of the bypass passage 306. An electric heater which is turned on only during the starting operation is disposed in the middle of the supply passage 303a at a portion upstream of the hydrogen discharging tank 302.

A first changeover valve 309 is provided at the junction of the bypass passage 306 to the supply passage 303a and a second changeover valve 310 is provided at the junction of the bypass passage 306 to the return passage 303b. The changeover valves 309 and 310 may be a three-way solenoid valve. The first and second changeover valves 309 and 310 are controlled so that engine cooling water flows in the direction shown by the broken line arrows during the starting of the engine and in the direction shown by the solid line arrows after the engine is started.

Figure 25:
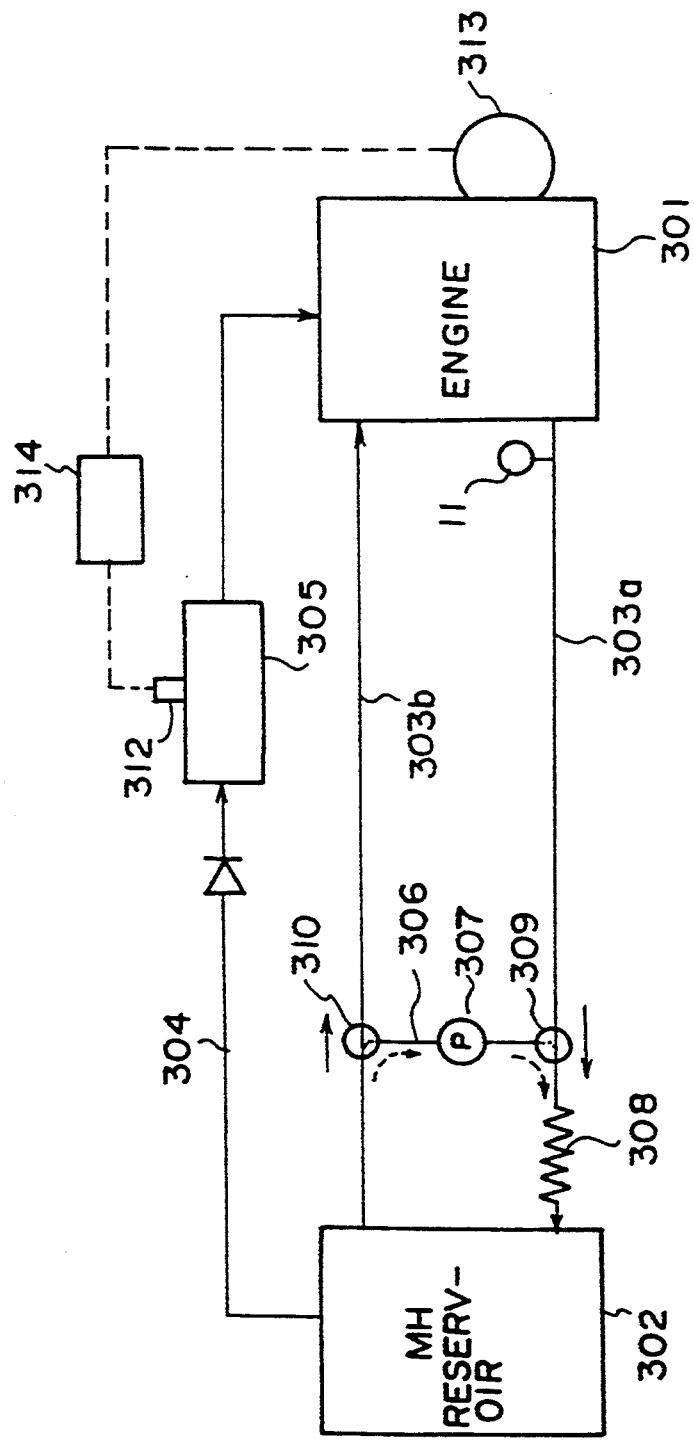
FIG. 25 is a schematic view showing still another embodiment of the present invention.
Figure 26:
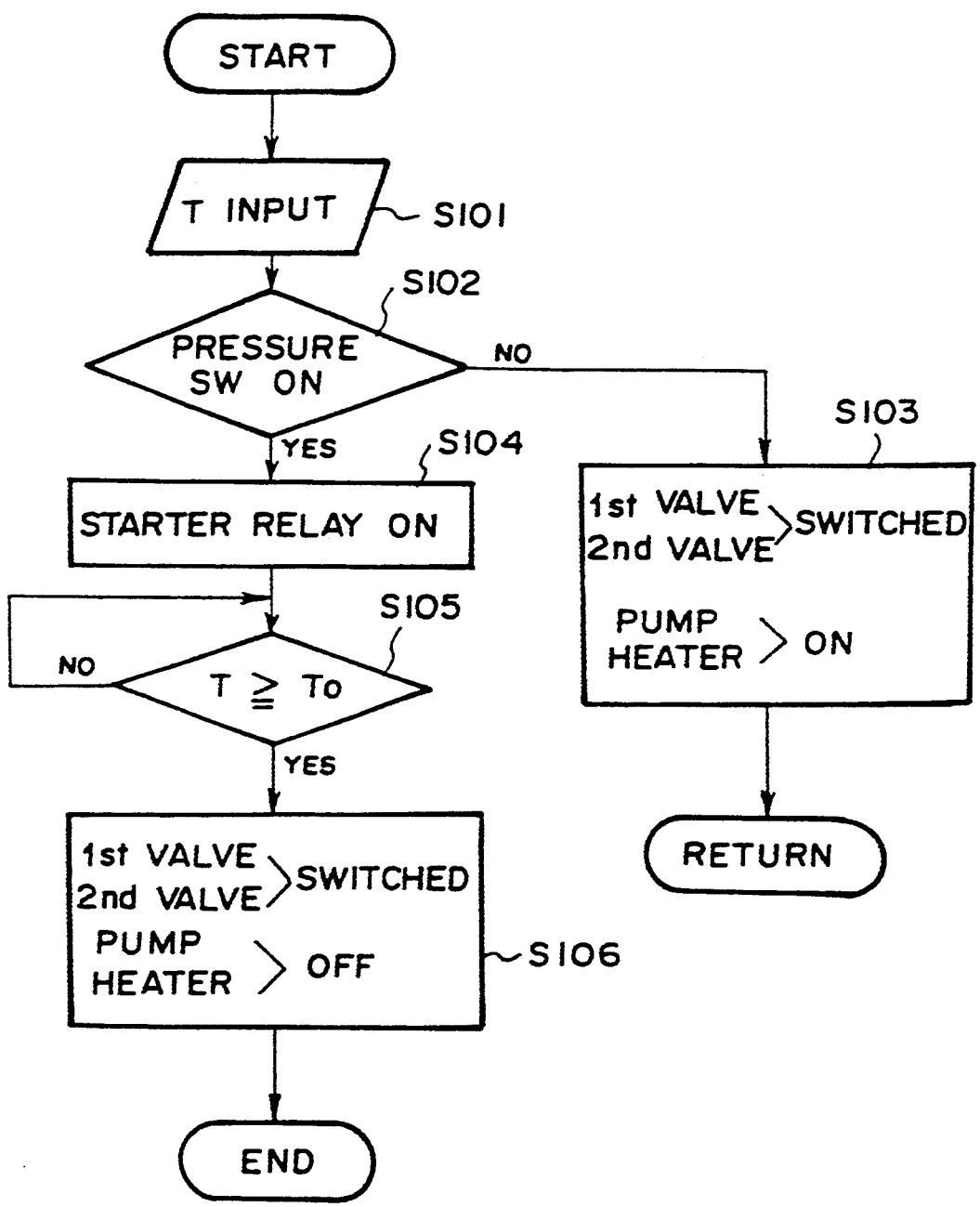
FIG. 26 is a flow chart for illustrating the operation of the engine.

Referring still to FIG. 25, a temperature sensor 11 detects the temperature T of the engine cooling water at the entrance side of the heating medium passage 303. A pressure switch 312 is turned on when the pressure P in the pressure tank 305 reaches the predetermined value Po. A starter relay 314 controls energization of a starter motor 313, and a check valve 315 prevents back current of the engine cooling water.

Figure 27:
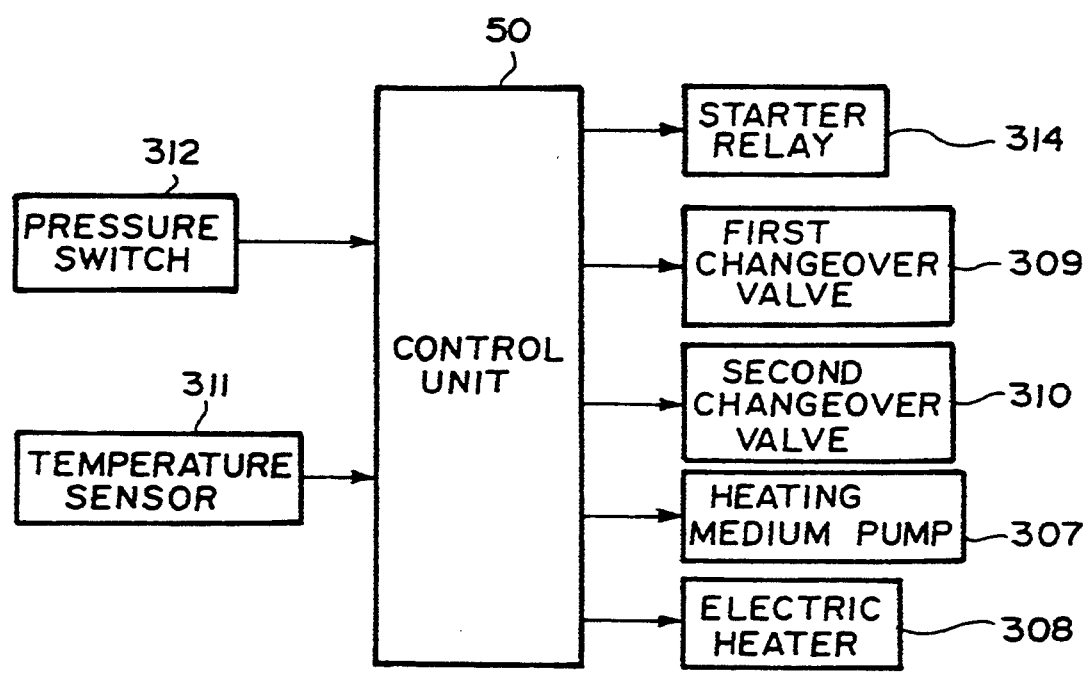
FIG. 27 is a block diagram schematically showing the structure of the hydrogen engine shown in FIG. 25.

As shown in FIG. 27, the engine 301, the pump 307, the electric heater 308, and the first and the second changeover valves 309 and 310 are controlled by a control unit 50 which is operated in accordance with signals generated from the temperature sensor 311 and the pressure switch 312.

Hereinafter, the control of the hydrogen engine according to the alternative embodiment of the present invention will be described by the flow chart in FIG. 26.

In step 101, the control unit 50 reads the temperature T of the engine cooling water at the start of the engine. Then, in step 102, the control unit determines whether or not the pressure switch 312 is on. When the answer to the question in step 102 is no (i.e., pressure P<pressure Po), the control unit 50 actuates the first and second changeover valves 309 and 310 so that the engine cooling water flows through the short circuit including the bypass passage 306, and turns on the pump 307 and the heater 308 (step 103). Accordingly, the flowing engine cooling water heats the hydrogen discharging tank 302, and as a result, the hydrogen gas can be discharged from the hydrogen discharging tank 302. The hydrogen gas is supplied to the pressure tank 305 through the hydrogen supply passage 304. Thereby, the pressure P of the hydrogen gas in the pressure tank becomes higher. When the pressure P of the hydrogen gas reaches the predetermined value Po, the control unit 50 turns the pressure switch 312 on. Then, the control unit 50 turns on the started relay 314 to energize the started motor 313 (steps 102 and 104), thereby starting the engine. After the engine 301 is started, the engine cooling water beings to flow through the heating medium passage 303. However, at the initial start of the engine, the temperature of the engine cooling water is so low that the hydrogen gas cannot be released from the hydrogen storage alloy in the hydrogen discharging tank 302. Accordingly, the engine cooling water is kept flowing through the bypass passage 306. And when the control unit 50 detects that the temperature T at the entrance of the heating medium passage 303 reaches the predetermined value To (i.e., the temperature is high enough to release the hydrogen gas from the hydrogen storage alloy), the control unit 50 returns the first and the second changeover valves 309 and 310 to the original state and turns off the pump 307 and the heater 308 (step 106), whereby the engine 301 is maintained driven in a usual state. In the usual state, the hydrogen storage alloy in the hydrogen discharging tank 302 is heated by the engine cooling water which is supplied through the heating medium passage 303 from the engine 301, and the hydrogen gas is thereby released from the hydrogen storage alloy.

As described in detail above, with the hydrogen engine apparatus in accordance with the alternative embodiment of the present invention, when the engine starter motor switch is turned on, the engine 301 cannot be started until the pressure P of hydrogen gas builds up to a predetermined value Po. Accordingly, at the time of starting the engine, the hydrogen gas and the battery power for driving the starter motor will not be wasted.

While the invention has been described particularly with reference to a preferred embodiment thereof, it will be understood by those skilled in the art that foregoing and other changes in form and detail can be made therein without departing from the scope of the present invention.

What is claimed is:

1. A hydrogen engine comprising:
an engine body,
a hydrogen discharging tank containing a hydrogen storage alloy, which is connected to the engine body,
a heating medium passage through which a heating medium for heating said hydrogen storage alloy is caused to flow,
a hydrogen supply passage through which a hydrogen gas discharged from said hydrogen discharging tank is supplied to said engine body as fuel,
a pressure tank provided in said hydrogen supply passage to store said hydrogen gas, and
a control means for limiting starting of the engine until the pressure of the hydrogen gas in the pressure tank reaches a predetermined value.

2. A hydrogen engine as defined in claim 1 in which said control means is a unit which controls energization of a starter motor for starting the engine.

3. A hydrogen engine as defined in claim 1 in which said heating medium is engine cooling water.

4. A hydrogen engine as defined in claim 3 wherein said engine cooling water is caused to flow through said heating medium passage by a water pump provided in the engine after the engine is started, and further comprising another pump whereby the engine cooling water flows through said heating medium passage before the engine is started.

5. A hydrogen engine as defined in claim 3 further comprising a heating means separately provided from the engine.

6. A hydrogen engine as defined in claim 5 in which said heating means is an electric heater.

7. A hydrogen engine as defined in claim 3 further comprising a temperature detecting means which detects the temperature of the engine cooling water, and a bypass passage which directly connects a supply passage and a return passage of said heating medium passage when the temperature of the engine cooling water is lower than a predetermined value.

* * * * *